US012492245B2

(12) United States Patent
Kiaris et al.

(10) Patent No.: US 12,492,245 B2
(45) Date of Patent: Dec. 9, 2025

(54) ANTI-CCL8 ANTIBODIES AND TREATMENT OF LUNG INJURY BY CCL8 INHIBITION

(71) Applicant: UNIVERSITY OF SOUTH CAROLINA, Columbia, SC (US)

(72) Inventors: Hippokratis Kiaris, Irmo, SC (US); Ioulia Chatzistamou, Irmo, SC (US); Asieh Naderi, Columbia, SC (US); Bernardo Chavez, Columbia, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 4 days.

(21) Appl. No.: 17/870,593

(22) Filed: Jul. 21, 2022

(65) Prior Publication Data
US 2023/0139938 A1    May 4, 2023

Related U.S. Application Data

(60) Provisional application No. 63/246,423, filed on Sep. 21, 2021.

(51) Int. Cl.
*C07K 16/24* (2006.01)
*A61K 39/00* (2006.01)
*A61P 11/00* (2006.01)
*A61P 29/00* (2006.01)
*G01N 33/50* (2006.01)

(52) U.S. Cl.
CPC .............. *C07K 16/24* (2013.01); *A61P 11/00* (2018.01); *A61P 29/00* (2018.01); *G01N 33/5088* (2013.01); *A61K 2039/505* (2013.01); *A61K 2039/545* (2013.01); *C07K 2317/565* (2013.01); *C07K 2317/76* (2013.01)

(58) Field of Classification Search
None
See application file for complete search history.

(56) References Cited

U.S. PATENT DOCUMENTS

| 4,522,811 A | 6/1985 | Eppstein et al. |
| 4,868,116 A | 9/1989 | Morgan et al. |
| 4,980,286 A | 12/1990 | Morgan et al. |
| 5,135,917 A | 8/1992 | Burch |
| 5,168,053 A | 12/1992 | Altman et al. |

(Continued)

FOREIGN PATENT DOCUMENTS

| CN | 102319241 | 1/2012 |
| JP | 2010-229038 | 10/2010 |

(Continued)

OTHER PUBLICATIONS

Honda et al. Pathogenic roles and therapeutic potential of the CCL8-CCR8 axis in a murine model of IgG4-related sialadenitis. Arthritis Res Ther 23, 214 (2021). https://doi.org/10.1186/s13075-021-02597-6 (Year: 2021).*

(Continued)

*Primary Examiner* — Amy E Juedes
*Assistant Examiner* — Hilary Ann Petrash
(74) *Attorney, Agent, or Firm* — DORITY & MANNING, P.A

(57) ABSTRACT

Methods for treating lung injury by administration of an anti-CCL8 antibody are disclosed. Also disclosed are methods for evaluating lung therapies by use of an animal model of the genus *Peromyscus*.

4 Claims, 11 Drawing Sheets

Specification includes a Sequence Listing.

SEQ ID NO: 3 - Heavy chain–variable region–DNA (402 BP)

SEQ ID NO: 4 - Heavy chain–variable region–amino acid (134 AA)

SEQ ID NO: 11 - Light chain 1–variable region–DNA (398 BP)

SEQ ID NO: 12 - Light chain 1–variable region–amino acid (132 AA)

SEQ ID NO: 19 - Light chain 2–variable region–DNA (361 BP)

SEQ ID NO: 20 - Light chain 2–variable region–amino acid (127 AA)

(56) References Cited

U.S. PATENT DOCUMENTS

| | | | |
|---|---|---|---|
| 5,176,996 | A | 1/1993 | Hogan et al. |
| 5,334,711 | A | 8/1994 | Sproat et al. |
| 5,476,766 | A | 12/1995 | Gold et al. |
| 5,543,293 | A | 8/1996 | Gold et al. |
| 5,580,967 | A | 12/1996 | Joyce |
| 5,595,873 | A | 1/1997 | Joyce |
| 5,624,824 | A | 4/1997 | Yuan et al. |
| 5,631,115 | A | 5/1997 | Ohtsuka et al. |
| 5,646,042 | A | 7/1997 | Stinchcomb et al. |
| 5,652,107 | A | 7/1997 | Lizardi et al. |
| 5,683,873 | A | 11/1997 | George et al. |
| 5,683,874 | A | 11/1997 | Kool |
| 5,728,521 | A | 3/1998 | Yuan et al. |
| 5,861,254 | A | 1/1999 | Schneider et al. |
| 5,861,288 | A | 1/1999 | Usman et al. |
| 5,869,248 | A | 2/1999 | Yuan et al. |
| 5,869,253 | A | 2/1999 | Draper |
| 5,874,566 | A | 2/1999 | Veerapanane et al. |
| 5,877,162 | A | 3/1999 | Werner et al. |
| 5,910,408 | A | 6/1999 | Szostak et al. |
| 5,962,426 | A | 10/1999 | Glazer |
| 5,989,906 | A | 11/1999 | Thompson |
| 5,994,320 | A | 11/1999 | Low et al. |
| 6,017,756 | A | 1/2000 | Draper |
| 6,022,962 | A | 2/2000 | Chowrira et al. |
| 6,030,776 | A | 2/2000 | Eaton et al. |
| 6,046,319 | A | 4/2000 | Power et al. |
| 6,051,698 | A | 4/2000 | Janjic et al. |
| 6,057,437 | A | 5/2000 | Kamiya et al. |
| 6,562,347 | B1 | 5/2003 | Kwak et al. |
| 10,723,794 | B2 | 7/2020 | Kiaris et al. |
| 2001/0046496 | A1* | 11/2001 | Brettman ............ A61P 1/18 424/142.1 |
| 2011/0082185 | A1 | 4/2011 | Caballero et al. |
| 2011/0287036 | A1 | 11/2011 | Matsumura et al. |
| 2012/0214864 | A1 | 8/2012 | Richer et al. |
| 2013/0189367 | A1 | 7/2013 | Zhang et al. |
| 2013/0251752 | A1 | 9/2013 | Antonia et al. |
| 2013/0261058 | A1 | 10/2013 | Schally et al. |
| 2014/0186468 | A1 | 7/2014 | Gonzalo et al. |
| 2014/0303133 | A1 | 10/2014 | Pientenpol et al. |
| 2016/0272702 | A1 | 9/2016 | Kiaris et al. |
| 2019/0359700 | A1* | 11/2019 | Kiaris ............ C07K 16/3015 |

FOREIGN PATENT DOCUMENTS

| | | | |
|---|---|---|---|
| JP | 2016222656 A | * | 12/2016 |
| WO | WO 89/07136 | | 8/1989 |
| WO | WO 90/02806 | | 3/1990 |
| WO | WO 97/18312 | | 5/1997 |
| WO | WO 98/58058 | | 12/1998 |
| WO | WO 2008/052566 | | 5/2008 |

OTHER PUBLICATIONS

Stone et al. IgG4-Related Disease. N Engl J Med 2012; 366:539-551. DOI: 10.1056/NEJMra1104650. 2012 (Year: 2012).*

Medina et al. Ribavirin, human convalescent plasma and anti-B 3 integrin antibody inhibit infection by Sin Nombre virus in the deer mouse model. Journal of General Virology. vol. 88, Issue 2. Published: Feb. 1, 2007 https://doi.org/10.1099/vir.0.82459-0. (Year: 2007).*

Griffin et al. SARS-CoV-2 infection and transmission in the North American deer mouse. Nat Commun 12, 3612 (2021). https://doi.org/10.1038/s41467-021-23848-9 (Year: 2021).*

Ascoli et al. Overlooked benefits of using polyclonal antibodies. BioTechniques, vol. 65, No. 3. 2018 https://doi.org/10.2144/btn-2018-0065 (Year: 2018).*

WIPO translation of the description section of JP-2016222656-A (Year: 2016).*

Pathogenic Definition & Meaning—Merriam-Webster: https://www.merriam-webster.com/dictionary/pathogenic. accessed online Dec. 26, 2023 (Year: 2023).*

Matute-Bello et al. Animal models of acute lung injury. American Journal of Physiology-Lung Cellular and Molecular Physiology 2008 295:3, L379-L399 (Year: 2008).*

Sipahi et al. Experimental Models of Acute Lung Injury. Eurasian J Pulmonol 2014; 16: 69-77, p. 70, 2nd col. 3rd paragraph (Year: 2014).*

Miller et al. Inflammation-associated gene transcription and expression in mouse lungs induced by low molecular weight compounds from fungi from the built environment. Chemico-Biological Interactions 183 (2010) 113-124 (Year: 2010).*

Melchjorsen et al. Expression and function of chemokines during viral infections: from molecular mechanisms to in vivo function. Journal of Leukocyte Biology vol. 74, Sep. 2003 (Year: 2003).*

Dulek et al. Allergic Airway Inflammation Decreases Lung Bacterial Burden following Acute Klebsiella pneumoniae Infection in a Neutrophil- and CCL8-Dependent Manner. Infection and Immunity. vol. 82. No. 9. p. 3723-3739 Sep. (Year: 2014).*

Franz Puttur et al. Pulmonary environmental cues drive group 2 innate lymphoid cell dynamics in mice and humans. Sci. Immunol. 4, eaav7638(2019).DOI:10.1126/sciimmunol.aav7638). (Year: 2019).*

Kamisawa et al. IgG4-related disease. vol. 385, Iss 9976, P1460-1471. 2015. DOI: https://doi.org/10.1016/S0140-6736(14)60720-0 (Year: 2015).*

Khalil et al. (2021). Chemokines and chemokine receptors during COVID-19 infection. Computational and structural biotechnology journal, 19, 976-988 (Year: 2021).*

Wigen et al. Converging pathways in pulmonary fibrosis and Covid-19—The fibrotic link to disease severity. Respiratory Medicine: X vol. 2 (2020) 100023 (Year: 2020).*

Liu et al. CC Chemokines in Idiopathic Pulmonary Fibrosis: Pathogenic Role and Therapeutic Potential. Biomolecules 2023, 13, 333. https://doi.org/10.3390/ biom13020333 (Year: 2023).*

Naderi et al. Beneficial effects of CCL8 inhibition at lipopolysaccharide-induced lung injury. 2022. vol. 25, Issue 12, 105520 (Year: 2022).*

Li et al. 2021. The chemokine CCL1 triggers an AMFR-SPRY1 pathway that promotes differentiation of lung fibroblasts into myofibroblasts and drives pulmonary fibrosis. Immunity 54, 2042-2056 (Year: 2021).*

Kawano-Dourado L, Bonfiglioli K, Medeiros-Ribeiro AC, et al. AB0716 Plasma Biomarkers in Rheumatoid Arthritis-Associated Interstitial Lung Disease (RA-ILD): Fibrotic Versus Non-Fibrotic Disease (Bertha Study Baseline Data) Annals of the Rheumatic Diseases 2024;83:1648-1649.) (Year: 2024).*

Almagro et al., Humanization of Antibodies, Frontiers in Bioscience, vol. 13, 2008, 1619-1633. https://doi.org/10.2741/2786 https://article.imrpress.com/bri/Landmark/articles/pdf/Landmark2786.pdf.

Ashcroft et al., Simple Method of Estimating Severity of Pulmonary Fibrosis on a Numerical Scale, Journal of Clinical Pathology, vol. 41, No. 4, 1988, 467-470. https://doi.org/10.1136/jcp.41.4.467.

Azadeh et al., The Role of Infection in Interstitial Lung Diseases: A Review, Chest, vol. 152, No. 4, 2017, 842-852. https://doi.org/10.1016/j.chest.2017.03.033.

Baudouin, Manipulation of Inflammation in ARDS: Achievable Goal or Distant Target?, Thorax, vol. 61, No. 6, 2006, 464-465. https://www.ncbi.nlm.nih.gov/pmc/articles/PMC2111215/.

Bedford et al., Peromyscus Mice as a Model for Studying Natural Variation, eLIFE Sciences, vol. 4, 2015, e06813, pp. 1-13. https://doi.org/10.7554/elife.06813.

Bennett et al., Evaluation of Cyclosporine-Treated Mice as Hosts for Growing and Testing the Chemosensitivity of First-Transplant-Generation Human Tumor Xenografts Implanted Under the Kidney Capsule, Journal of the National Cancer Institute, vol. 75, Issue 5, 1985, 925-936. (Abstract Only) https://doi.org/10.1093/jnci/75.5.925.

Bhowmick et al., TGF-β Signaling in Fibroblasts Modulates the Oncogenic Potential of Adjacent Epithelia, Science, vol. 303, Issue No. 5659, 2004, 848-851. https://doi.org/10.1126/science.1090922.

Blanco-Melo et al., Imbalanced Host Response to SARS-CoV-2 Drives Development of COVID-19, Cell, vol. 181, No. 5, 2020, 1036-1045. https://doi.org/10.1016/j.cell.2020.04.026.

Bradley, TNF-Mediated Inflammatory Disease, The Journal of Pathology, vol. 214, Issue 2, 149-160. https://doi.org/10.1002/path.2287.

(56) References Cited

OTHER PUBLICATIONS

Cassetta et al., Human Tumor-Associated Macrophage and Monocyte Transcriptional Landscapes Reveal Cancer-Specific Reprogramming, Biomarkers, and Therapeutic Targets, Cancer Cell, vol. 35, No. 4, 2019, 588-602. https://doi.org/10.1016/j.ccell.2019.02.009.

Chatzistamou et al., The Value of Outbred Rodent Models in Cancer Research, Trends in Cancer, vol. 4, No. 7, 2018, 468-471. (Abstract Only) https://doi.org/10.1016/j.trecan.2018.05.004.

Churchill et al., The Collaborative Cross, a Community Resource for the Genetic Analysis of Complex Traits, Nature Genetics, vol. 36, No. 11, 2004, 1133-1137. https://doi.org/10.1038/ng1104-1133.

Day et al., Preclinical Mouse Cancer Models: A Maze of Opportunities and Challenges, Cell, vol. 163, No. 1, 2015, 39-53. https://doi.org/10.1016/j.cell.2015.08.068.

De Genst et al., Antibody Repertoire Development in Camelids, Developmental & Comparative Immunology, vol. 30, vol. 30, 2006, 187-198.

De Souza Xavier Costa et al., Early and Late Pulmonary Effects of Nebulized LPS in Mice: An Acute Lung Injury Model, PLoS One, vol. 12, No. 9, 2017, e0185474, 16 Pages. https://doi.org/10.1371/journal.pone.0185474.

Domscheit et al., Molecular Dynamics of Lipopolysaccharide-Induced Lung Injury in Rodents, Frontiers in Physiology, vol. 11, Article 36, 2020, 8 Pages. https://doi.org/10.3389%2Ffphys.2020.00036.

Fan et al., COVID-19-Associated Acute Respiratory Distress Syndrome: Is a Different Approach to Management Warranted? Lancet, Respiratory Medicine, vol. 8, No. 8, 2020, 816-821. https://doi.org/10.1016/s2213-2600(20)30304-0.

Farmaki et al., A CCL8 Gradient Drives Breast Cancer Cell Dissemination, Oncogene, vol. 35, No. 49, 2016, 6309-6318. https://doi.org/10.1038/onc.2016.161.

Farmaki et al., CCL8 Promotes Postpartum Breast Cancer by Recruiting M2 Macrophages, iScience, vol. 23, No. 6, 2020, 101217, 18 Pages. https://doi.org/10.1016%2Fj.isci.2020.101217.

Fernandez et al., New Cellular and Molecular Mechanisms of Lung Injury and Fibrosis in Idiopathic Pulmonary Fibrosis, Lancet, vol. 380, No. 9842, 2012, 680-688. https://doi.org/10.1016/s0140-6736(12)61144-1.

Fidler, The Pathogenesis of Cancer Metastasis: The 'Seed and Soil' Hypothesis Revisited, Nature Reviews Cancer, vol. 3, 2003, 453-458. https://doi.org/10.1038/nrc1098.

Fingert et al., Transplantation of Human or Rodent Tumors into Cyclosporine-Treated Mice: A Feasible for Studies of Tumor Biology and Chemotherapy, Proceedings of the National Academy of Sciences of the United States of America, vol. 81, No. 24, 1984, 7927-7931. https://doi.org/10.1073%2Fpnas.81.24.7927.

Fraser, Long Term Respiratory Complications of COVID-19, BMJ, 2020, 370m3001, 2 Pages. https://doi.org/10.1136/bmj.m3001.

Gallelli et al., Severe Acute Lung Injury Related to COVID-19 Infection: A Review and the Possible Role for Escin, Journal of Clinical Pharmacology, vol. 60, No. 7, 2020, 815-825. https://doi.org/10.1002/jcph.1644.

Gilbert, Advancing Towards Precision Medicine in ARDS, Lancet Respiratory Medicine, vol. 6, Issue 7, 2018, 494-495. https://doi.org/10.1016/S2213-2600(18)30156-5.

Goodman et al., A Model of Human Melanoma in Cyclosporine-Immunosuppressed Rats, Journal of Investigative Dermatology, vol. 88, No. 2, 1987, 141-144. https://doi.org/10.1111/1523-1747.ep12525289.

Havighorst et al., Differential Regulation of the Unfolded Protein Response in Outbred Deer Mice and Susceptibility to Metabolic Disease, Disease Models & Mechanisms, vol. 12, No. 2, 2019, dmm037242, https://doi.org/10.1242/dmm.037242.

Havighorst et al., Peromyscus as a Model of Human Disease, Seminars in Cell & Developmental Biology, vol. 61, 2017, 150-155. https://doi.org/10.1016/j.semodb.2016.06.020.

Hori et al., CCL8 is a Potential Molecular Candidate for the Diagnosis of Graft-Versus-Host Disease, Blood, vol. 111, No. 8, 2008, 4403-4412. https://doi.org/10.1182/blood-2007-06-097287.

Igarashi et al., CCL8 Deficiency in Host Strongly Inhibits Early Mortality and Morbidity of Graft-Versus-Host Disease in Mice, Blood, vol. 124, Issue 21, 2014, 1096. https://doi.org/10.1182/blood.V124.21.1096.1096.

Jenkins, IPF: Moving from Idiopathic to Infectious Pulmonary Fibrosis? American Journal of Respiratory and Critical Care Medicine, List of Issues, vol. 196, Issue 2, 2017, 125-127. https://doi.org/10.1164/rccm.201702-0387ED.

King, Idiopathic Pulmonary Fibrosis, Lancet, vol. 378, No. 9807, 2011, 1949-1961. (Abstract Only) https://doi.org/10.1016/s0140-6736(11)60052-4.

Lebleu, et al. "PGC-1$\alpha$ mediates mitochondrial biogenesis and oxidative phosphorylation in cancer cells to promote metastasis" *Nat Cell Biol.* 16(10) (2014) pp. 992-1003.

Lee et al., Gene Profile of Fibroblasts Identify Relation of CCL8 with Idiopathic Pulmonary Fibrosis, Respiratory Research, vol. 18.3, No. 1, 2017, 12 Pages. https://doi.org/10.1186/s12931-016-0493-6.

Liu et al., Induction of CCL8/MCP-2 by Mycobacteria Through the Activation of TLR2/PI3K/Akt Signaling Pathway, PLoS One, vol. 8, No. 2, 2013, e56815, 12 Pages. https://doi.org/10.1371/journal.pone.0056815.

Luzina et al., Transcriptomic Evidence of Immune Activation in Macroscopically Normal-Appearing and Scarred Lung Tissues in Idiopathic Pulmonary Fibrosis, Cell Immunology, vol. 325, Nos. 1-13, 27 Pages. https://doi.org/10.1016/j.cellimm.2018.01.002.

Mason et al., Acute Respiratory Distress Syndrome, Clinical Medicine, vol. 17, No. 5, 2017, 439-443. https://doi.org/10.7861%2Fclinmedicine.17-5-439.

Ota et al., Upregulation of Plasma CCL8 in Mouse Model of Graft-VS-Host Disease, Experimental Hematology, vol. 37, 2009, 525-531. https://doi.org/10.1016/j.exphem.2008.12.006.

Parameswaran et al., Tumor Necrosis Factor-$\alpha$ Signaling in Macrophages, Crit Rev Eukaryot Gene Expr, vol. 20, No. 2, 2010, 87-103. https://doi.org/10.1615%2Fcritreveukargeneexpr.v20.12.10.

Pitteri et al., Tumor Microenvironment-Derived Proteins Dominate the Plasma Proteome Response During Breast Cancer Induction and Progression, Cancer Research, vol. 71, No. 15, 2011, 5090-5100. https://www.ncbi.nlm.nih.gov/pmc/articles/PMC3148311/pdf/nihms302509.pdf.

Rafikov et al. Lipopolysaccharide-Induced Lung Injury Involves The Nitration-Mediated Activation of RhoA, Journal of Biological Chemistry, vol. 289, No. 8, 2014, 4710-4722. https://doi.org/10.1074/jbc.m114.547596.

Rajaram et al., System-Wide Analysis Reveals a Complex Network of Tumor-Fibroblast Interactions Involved in Tumorigenicity, PLoS Genetics, vol. 9, Issue 9, e1002789, 2013, 1-16. https://doi.org/10.1371/journal.pgen.1003789.

Satija et al., Heterogeneity in Immune Responses: From Populations to Single Cells, Trends in Immunology, vol. 35, No. 5, 2014, 219-229. https://doi.org/10.1016/j.it.2014.03.004.

Schwaiblmair et al., Drug Induced Interstitial Lung Disease, The Open Respiratory Medicine Journal, vol. 6, 2012, 63-74. https://doi.org/10.2174/1874306401206010063.

Severa et al., The Transcriptional Repressor BLIMP1 Curbs Host Defenses by Suppressing Expression of the Chemokine CCL8, Journal of Immunology, vol. 192, No. 5, 2014, 2291-2304. https://doi.org/10.4049/jimmunol.1301799.

Svenson et al., High-Resolution Genetic Mapping Using the Mouse Diversity Outbred Population, Genetics, vol. 190, 2012, 437-447. https://doi.org/10.1534/genetics.111.132597.

Tale et al. Post-COVID-19 Pneumonia Pulmonary Fibrosis, QJM: An International Journal of Medicine, vol. 113, Issue 11, 2020, 837-838. https://doi.org/10.1093/qjmed/hcaa255.

Taub et al., Monocyte Chemotactic Protein-1 (MCP-1), -2, and -3 Are Chemotactic for Human T Lymphocytes, Journal of Clinical Investigation Inc., vol. 95, 1995, 1370-1376. http://dx.doi.org/10.1172/JCI117788.

(56) References Cited

OTHER PUBLICATIONS

Thomas et al., CC Chemokines are Differentially Expressed in Breast Cancer and are Associated with Disparity in Overall Survival, Scientific Reports, vol. 9, Article No. 4014, 2019, 12 Pages. https://www.nature.com/articles/s41598-019-40514-9.
Thoutam et al., Coronavirus: A Shift in Focus Away from IFN Response and Towards Other Inflammatory Targets, Journal of Cell Communication and Signaling, vol. 1-2, 2020, 2 Pages. https://doi.org/10.1007/s12079-020-00574-3.
Torres et al., Proteome Profiling of Cancer-Associated Fibroblasts Identifies Novel Proinflammatory Signatures and Prognostic Markers for Colorectal Cancer, Clinical Cancer Research, vol. 19, No. 21, 2013, 6006-6019. https://doi.org/10.1158/1078-0432.ccr~13~1130.
Vanharanta et al., Origins of Metastatic Traits, Cancer Cell, vol. 24, Issue 4, 2013, 410-421. https://doi.org/10.1016/j.ccr.2013.09.007.
Wade et al., Genetic Variation in Laboratory Mice, Nature Genetics, vol. 37, No. 11, 2005, 1175-1180. https://doi.org/10.1038/ng1666.
Yoshinaga et al., Ig L-Chain Shuffling for Affinity Maturation of Phage Library-Derived Human Anti-Human MCP-1 Antibody Blocking its Chemotactic Activity, Japanese Biochemical Society, vol. 143, No. 5, 2008, 593-601.

\* cited by examiner

SEQ ID NO: 3 - Heavy chain-variable region-DNA (402 BP)

ATGGAATGTAACTGGATACTTCCTTTTATTCTGTCGGTAATTTCAGGGGTCTACTCAGAGGTTC
AGCTCCAGCAGTCTGGGACTGTGCTGGCAAGGCCTGGGGCTTCCGTGAAGATGTCCTGTAAGGC
TTCTGGCTACAGCTTTACCAGCTACTGGATGCACTGGGTCAAACAGAGGCCTGGACAGGGTCTG
GAATGGATTGGTGCTATTTATCCTGGAAATAGTGATAGTGGCTACAATAAGAAGTTCAAGGGCA
AGGCCAAACTGACTGCAGTCACTTCCGCCAGCACTGCCTACATGGAGCTCAGCAGCTTGACAAA
TGAGGACTCTGCGGTCTATTACTGTTCCCATACAGCCTGGTTTGTTTACTGGGGCCAAGGGACT
CTGGTCACTGTCTCTGCA

SEQ ID NO: 4 - Heavy chain-variable region-amino acid (134 AA)

MECNWILPFILSVISGVYSEVQLQQSGTVLARPGASVKMSCKASGYSFTSYWMHWVKQRPGQGL
EWIGAIYPGNSDSGYNKKFKGKAKLTAVTSASTAYMELSSLTNEDSAVYYCSHTAWFVYWGQGT
LVTVSA

SEQ ID NO: 11 - Light chain 1-variable region-DNA (396 BP)

ATGATGAGTCCTGCCCAGTTCCTGTTTCTGTTAGTGCTCTGGATTCGGGAAACCAACGGTGATG
TTGTGATGACCCAGACTCCACTCACTTTGTCGGTTACCATTGGACAACCAGCCTCCATCTCTTG
CAAGTCAAGTCAGAGCCTCTTAGATAGTGATGGAAGGACATATTTGAATTGGTTGTTACAGAGG
CCAGGCCAGTCTCCAAAGCGCCTAATCTATCTGGTGTCTAAACTGGACTCTGGAGTCCCTGACA
GGTTCACTGGCAGTGGATCAGGGACAGATTTCACACTGAAAATCAGCAGAGTGGAGGCTGAGGA
TTTGGGAGTTTATTATTGCTGGCAAGGTGCACATTTTCCTCAGACGTTCGGTGGAGGCACCAAG
CTGGAAATCAAA

SEQ ID NO: 12 - Light chain 1-variable region-amino acid (132 AA)

MMSPAQFLFLLVLWIRETNGDVVMTQTPLTLSVTIGQPASISCKSSQSLLDSDGRTYLNWLLQR
PGQSPKRLIYLVSKLDSGVPDRFTGSGSGTDFTLKISRVEAEDLGVYYCWQGAHFPQTFGGGTK
LEIK

SEQ ID NO: 19 - Light chain 2-variable region-DNA (381 BP)

ATGAGGTTCCAGGTTCAGGTTCTGGGGCTCCTTCTGCTCTGGATATCAGGTGCCCAGTGTGATG
TCCAGATAACCCAGTCTCCATCTTATCTTGCTGCATCTCCTGGAGAAACCATTACTTTTAATTG
CAGGGCAAGTAAGAGCATTAGCAAATATTTCGCCTGGTATCAAGAGAAACCTGGGAAAACTAAT
AAGCTTCTTATCTACTCTGGATCCACTTTGCAATCTGGAATTCCATCAAGGTTCAGTGGCAGTG
GATCTGGTACAGATTTCAATCTCACCATCAGTAGCCTGGAGCCTGAAGATTTTGCAATGTATTA
CTGTCAACAGCATAATGAATACCCGCTCACGTTCGGTGCTGGGACCAAGCTGGAGCTGAAA

SEQ ID NO: 20 - Light chain 2-variable region-amino acid (127 AA)

MRFQVQVLGLLLLWISGAQCDVQITQSPSYLAASPGETITFNCRASKSISKYFAWYQEKPGKTN
KLLIYSGSTLQSGIPSRFSGSGSGTDFNLTISSLEPEDFAMYYCQQHNEYPLTFGAGTKLELK

FIG. 1

SEQ ID NO: 27 Light Chain 1-variable region human IgCK-DNA (720 BP)

ATGATGAGTCCTGCCCAGTTCCTGTTTCTGTTAGTGCTCTGGATTCGGGAAACCAACGGTGATG
TTGTGATGACCCAGACTCCACTCACTTTGTCGGTTACCATTGGACAACCAGCCTCCATCTCTTG
CAAGTCAAGTCAGAGCCTCTTAGATAGTGATGGAAGGACATATTTGAATTGGTTGTTACAGAGG
CCAGGCCAGTCTCCAAAGCGCCTAATCTATCTGGTGTCTAAACTGGACTCTGGAGTCCCTGACA
GGTTCACTGGCAGTGGATCAGGGACAGATTTCACACTGAAAATCAGCAGAGTGGAGGCTGAGGA
TTTGGGAGTTTATTATTGCTGGCAAGGTGCACATTTTCCTCAGACGTTCGGTGGAGGCACCAAG
CTGGAAATCAAACGTACGGTGGCTGCACCATCTGTCTTCATCTTCCCGCCATCTGATGAGCAGT
TGAAATCTGGAACTGCCTCTGTTGTGTGCCTGCTGAATAACTTCTATCCCAGAGAGGCCAAAGT
ACAGTGGAAGGTGGATAACGCCCTCCAATCGGGTAACTCCCAGGAGAGTGTCACAGAGCAGGAC
AGCAAGGACAGCACCTACAGCCTCAGCAGCACCCTGACGCTGAGCAAAGCAGACTACGAGAAAC
ACAAAGTCTACGCCTGCGAAGTCACCCATCAGGGCCTGAGCTCGCCCGTCACAAAGAGCTTCAA
CAGGGGAGAGTGTTAG

SEQ ID NO: 28 Light Chain 1-variable region human IgCK-amino acid (720 BP)

MMSPAQFLFLLVLWIRETNGDVVMTQTPLTLSVTIGQPASISCKSSQSLLDSDGRTYLNWLLQR
PGQSPKRLIYLVSKLDSGVPDRFTGSGSGTDFTLKISRVEAEDLGVYYCWQGAHFPQTFGGGTK
LEIKRTVAAPSVFIFPPSDEQLKSGTASVVCLLNNFYPREAKVQWKVDNALQSGNSQESVTEQD
SKDSTYSLSSTLTLSKADYEKHKVYACEVTHQGLSSPVTKSFNRGEC

FIG. 2

SEQ ID NO: 29 - Heavy chain-variable region human IgHG1-DNA (1401 BP)

ATGGAATGTAACTGGATACTTCCTTTTATTCTGTCGGTAATTTCAGGGGTCTACTCAGAGGTTC
AGCTCCAGCAGTCTGGGACTGTGCTGGCAAGGCCTGGGGCTTCCGTGAAGATGTCCTGTAAGGC
TTCTGGCTACAGCTTTACCAGCTACTGGATGCACTGGGTCAAACAGAGGCCTGGACAGGGTCTG
GAATGGATTGGTGCTATTTATCCTGGAAATAGTGATAGTGGCTACAATAAGAAGTTCAAGGGCA
AGGCCAAACTGACTGCAGTCACTTCCGCCAGCACTGCCTACATGGAGCTCAGCAGCTTGACAAA
TGAGGACTCTGCGGTCTATTACTGTTCCCATACAGCCTGGTTTGTTTACTGGGGCCAAGGGACT
CTGGTCACTGTCTCTGCAGCTAGCGCTAGCACCAAGGGCCCATCGGTCTTCCCCCTGGCACCCT
CCTCCAAGAGCACCTCTGGGGGCACAGCGGCCCTGGGCTGCCTGGTCAAGGACTACTTCCCCGA
GCCGGTGACGGTGTCGTGGAACTCAGGCGCCCTGACCAGCGGCGTGCACACCTTCCCGGCTGTC
CTACAGTCCTCAGGACTCTACTCCCTCAGCAGCGTGGTGACCGTGCCCTCCAGCAGCTTGGGCA
CCCAGACCTACATCTGCAACGTGAATCACAAGCCCAGCAACACCAAGGTGGACAAGAAAGTTGA
GCCCAAATCTTGTGACAAAACTCACACATGCCCACCGTGCCCAGCACCTGAACTCCTGGGGGGA
CCGTCAGTCTTCCTCTTCCCCCCAAAACCCAAGGACACCCTCATGATCTCCCGGACCCCTGAGG
TCACATGCGTGGTGGTGGACGTGAGCCACGAAGACCCTGAGGTCAAGTTCAACTGGTACGTGGA
CGGCGTGGAGGTGCATAATGCCAAGACAAAGCCGCGGGAGGAGCAGTACAACAGCACGTACCGT
GTGGTCAGCGTCCTCACCGTCCTGCACCAGGACTGGCTGAATGGCAAGGAGTACAAGTGCAAGG
TCTCCAACAAAGCCCTCCCAGCCCCCATCGAGAAAACCATCTCCAAAGCCAAAGGGCAGCCCCG
AGAACCACAGGTGTACACCCTGCCCCCATCCCGGGACGAGCTGACCAAGAACCAGGTCAGCCTG
ACCTGCCTGGTCAAAGGCTTCTATCCCAGCGACATCGCCGTGGAGTGGGAGAGCAATGGGCAGC
CGGAGAACAACTACAAGACCACGCCTCCCGTGCTGGACTCCGACGGCTCCTTCTTCCTCTACAG
CAAGCTCACCGTGGACAAGAGCAGGTGGCAGCAGGGGAACGTCTTCTCATGCTCCGTGATGCAT
GAGGCTCTGCACAACCACTACACGCAGAAGAGCCTCTCCCTGTCTCCGGGTAAATGA

SEQ ID NO: 30 - Heavy chain-variable region human IgHG1-amino acid (467 AA)

MECNWILPFILSVISGVYSEVQLQQSGTVLARPGASVKMSCKASGYSFTSYWMHWVKQRPGQGL
EWIGAIYPGNSDSGYNKKFKGKAKLTAVTSASTAYMELSSLTNEDSAVYYCSHTAWFVYWGQGT
LVTVSAASASTKGPSVFPLAPSSKSTSGGTAALGCLVKDYFPEPVTVSWNSGALTSGVHTFPAV
LQSSGLYSLSSVVTVPSSSLGTQTYICNVNHKPSNTKVDKKVEPKSCDKTHTCPPCPAPELLGG
PSVFLFPPKPKDTLMISRTPEVTCVVVDVSHEDPEVKFNWYVDGVEVHNAKTKPREEQYNSTYR
VVSVLTVLHQDWLNGKEYKCKVSNKALPAPIEKTISKAKGQPREPQVYTLPPSRDELTKNQVSL
TCLVKGFYPSDIAVEWESNGQPENNYKTTPPVLDSDGSFFLYSKLTVDKSRWQQGNVFSCSVMH
EALHNHYTQKSLSLSPGK

FIG. 3

＃ ANTI-CCL8 ANTIBODIES AND TREATMENT OF LUNG INJURY BY CCL8 INHIBITION

CROSS REFERENCE TO RELATED APPLICATION

This application claims filing benefit of U.S. Provisional Patent Application Ser. No. 63/246,423, entitled "Treatment of Lung Injury by CCL8 Inhibition, having a filing date of Sep. 21, 2021, which is incorporated herein by reference for all purposes.

GOVERNMENT SUPPORT CLAUSE

This invention was made with government support under Grant No. OIA1736150, awarded by the National Science Foundation. The government has certain rights in the invention.

SEQUENCE LISTING

This application contains a Sequence Listing which is being filed electronically in XML format concurrently herewith and is hereby incorporated by reference in its entirety. Said XML copy, created on Aug. 4, 2022, is named USC-679_Sequence_List.xml and is 31,615 bytes in size.

BACKGROUND

Chemokines are a superfamily of small, cytokine-like proteins that are resistant to hydrolysis, promote neovascularization or endothelial cell growth inhibition, induce cytoskeletal rearrangement, activate or inactivate lymphocytes, and mediate chemotaxis through interactions with G-protein coupled receptors. Chemokines can mediate the growth and migration of host cells that express their receptors.

CCL8 is a small chemoattractive cytokine belonging to the CC chemokine family that attracts monocytes, lymphocytes, basophils and eosinophils. The processed form (generally referred to as MCP-2) is understood to activate many different immune cells, including mast cells, eosinophils, and basophils implicated in allergic responses, and monocytes, T cells, and NK cells that are involved in the inflammatory response, and inhibits the chemotactic effect most predominantly of CCL7, but also of CCL2 and CCL5. CCL8 elicits its effects by binding to several different chemokine cell surface receptors, including CCR1, CCR2B and CCR5. CCL8 can bind heparin and is believed to play a role in neoplasia and inflammatory host responses. CCL8 is known to be involved in the pathogenesis of cancer, and its role in pathologies other than cancer has been suggested in conditions relevant to the execution of an aberrant pro-inflammatory response.

Lung injury is a serious condition that can be associated with acute respiratory distress syndrome (ARDS) and the development of lung fibrosis. It can be idiopathic, the result of inhalation of toxic agents, or a consequence of infections, such as SARS-CoV2 that is the cause of the COVID-19 pandemic. Uncontrolled pro-inflammatory response is considered essential in the pathogenesis of ARDS and fibrosis, and as such, suppression of inflammation is the strategy of choice for the management of the pathological consequences of lung injury. In the context of the COVID-19 pandemic, an eventual surge in fibrosis cases is anticipated, presenting major concerns for the public health, even when SARS-CoV2 infection rates decrease. Despite past progress in our understanding of lung disease pathogenesis, the therapeutic options available for the management of ARDS, as well as treatment and prevention of lung fibrosis, remain limited.

What are needed in the art are materials and methods for inhibiting CCL8 activity. Such materials and methods would be of benefit for treatment of lung injury, and in particular, treatment methods that can control pro-inflammatory response due to lung injury. Such methods can be used to ameliorate lung injury, including those that present with ARDS and/or lung fibrosis.

What are also needed in the art are improved animal models for use in studying potential treatment options for lung injuries, and in particular, lung injuries that involve an uncontrolled pro-inflammatory response. Typical laboratory mice-based animal models in lung treatment-related studies can show limited success due to the inbred nature of most animal models, as well as due to innate differences between animal and human proteins. For instance, murine CCL8 exhibits differences from human CCL8 that can negatively affect the correlation between initial murine model studies, and later, human studies in CCL8 research. An animal model that better simulates human response and improves the predictive value of animal models in study of lung injury therapies would be of great benefit in the art.

SUMMARY

Disclosed are methods for treatment of pathogenic pulmonary inflammation by administration of anti-CCL8 antibodies or fragments thereof. For instance, a method can include administration of an anti-CCL8 antibody to a subject suffering a pathogenic pulmonary inflammation, the antibody, or fragment thereof including CDR sequences described by SEQ ID NOs: 6, 8, 10, 14, 16, and 18 or CDR sequences described by SEQ ID NOs: 6, 8, 10, 22, 24, and 26.

Also disclosed are anti-CCL8 antibodies as may be used in disclosed methods including the light variable chain region described by SEQ ID NO: 27 and SEQ ID NO: 28 and the heavy chain variable region described by SEQ ID NO: 29 and SEQ ID NO: 30.

Also disclosed are methods for studying lung treatments by instigating a lung injury in an animal of the genus *Peromyscus*, administering a potential therapy to the animal and evaluating the animal to determine the effects of the potential therapy.

BRIEF DESCRIPTION OF THE DRAWINGS

The present invention may be better understood with reference to the accompanying figures, in which:

FIG. 1 presents a heavy chain variable region nucleotide sequence (SEQ ID NO: 3) and amino acid sequence (SEQ ID NO: 4); a first light chain variable region nucleotide sequence (SEQ ID NO: 11) and amino acid sequence (SEQ ID NO: 12); and a second light chain variable region nucleotide sequence (SEQ ID NO: 19) and amino acid sequence (SEQ ID NO: 20) of anti-CCL8 antibodies described herein.

FIG. 2 presents a light chain variable region nucleotide sequence (SEQ ID NO: 27) and amino acid sequence (SEQ ID NO: 28) of anti-CCL8 antibodies described herein.

FIG. 3 present the heavy chain variable region nucleotide sequence (SEQ ID NO: 29) and amino acid sequence (SEQ ID NO: 30) of anti-CCL8 antibodies described herein.

a. Representative microphotographs of H&E-stained sections of lungs of wild type (wt) and CCL8 knock out (KO) mice that received LPS. b. Density of inflammation evaluated histologically in wt (n=5) and CCL8KO (n=8) mice. c. Expression of IL1b, IL-6, and TNFα in the lungs of wt (n=5) and CCL8KO mice (n=7) following LPS administration as described. Results were normalized versus GAPDH expression, expressed in arbitrary units (AU), and analyzed by unpaired t-test. P values are indicated.

Figure 5:
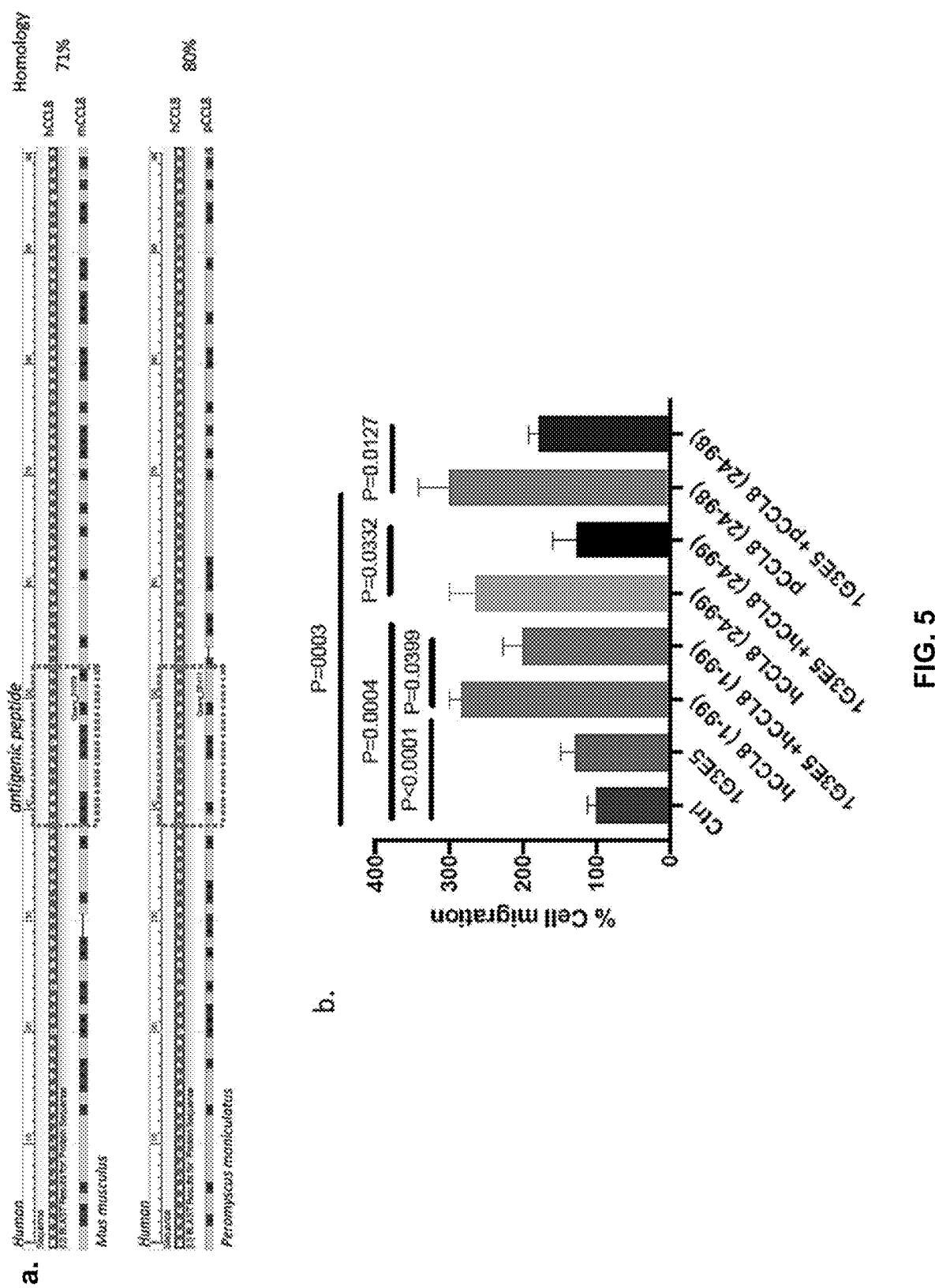

FIG. 5 illustrates the neutralizing activity of antibody 1G3E5 against CCL8 induced migration. a. Alignment between human CCL8 and mouse (Mus) (top) and between human and deer mouse (*Peromyscus maniculatus*) (bottom) CCL8. Homologies are shown. The antigenic peptide is indicated by the dashed square. b. Anti-CCL8 antibody 1G3E5 inhibits RAW macrophage migration that is induced by either human or *Peromyscus* CCL8. For human CCL8, versions with [hCCL8(1-99)] and without the signal peptide [(hCCL8(24-99)] while for *Peromyscus* CCL8 the version without the signal peptide was used [(24-98)]. RAW cells migrated in the presence of hCCL8 or anti8 at 10 ng/ml alone or combined with 1G3A5 at 1.5 ug/ml. Results are expressed as mean±SEM of 4-8 biological replicate experiments and analyzed by unpaired t-test. P values are shown.

Figure 6:
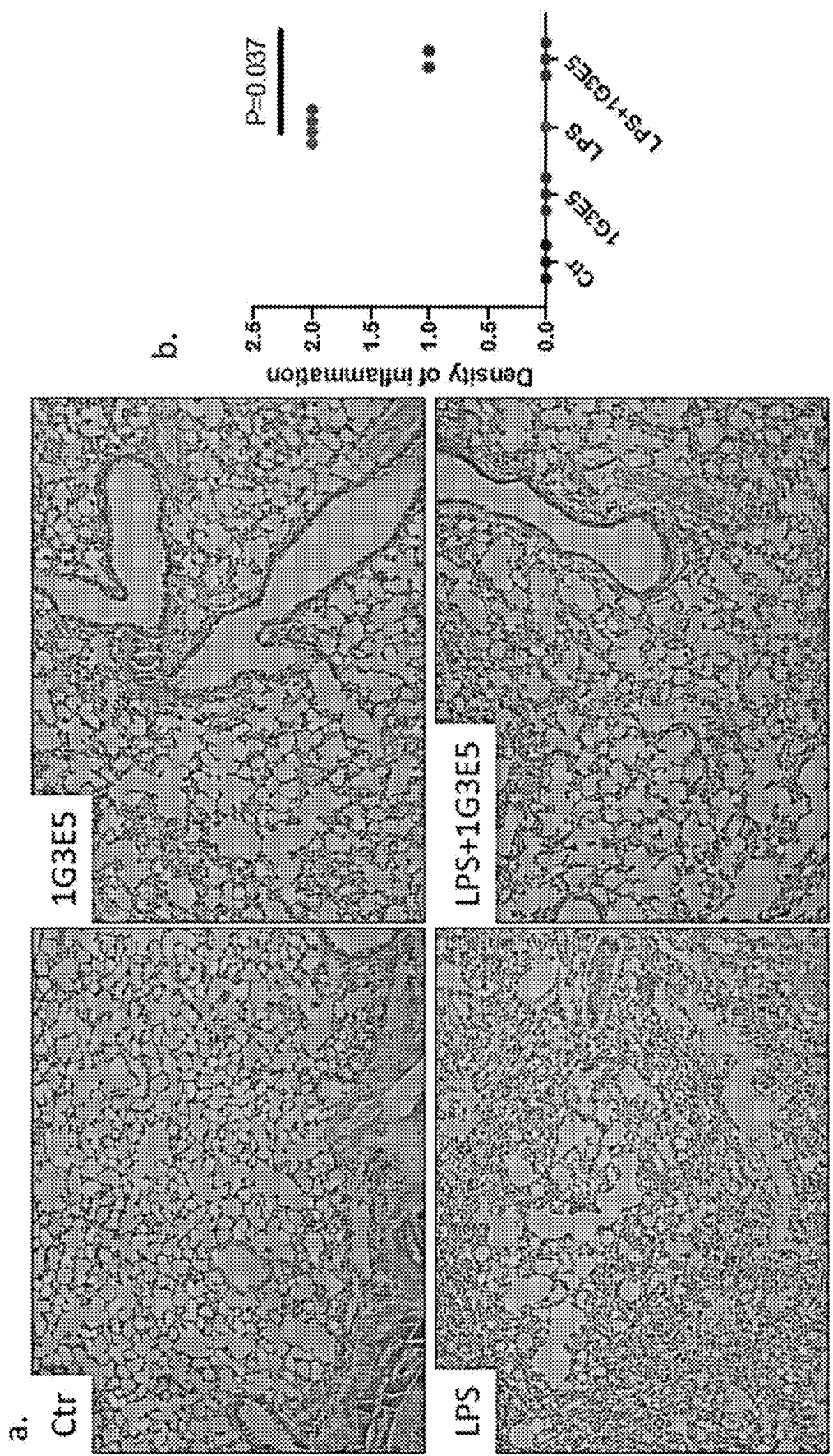

FIG. 6 illustrates the effect of 1G3E5 in LPS-induced pulmonary inflammation in deer mice (*P. maniculatus*). Animals received 2 mg LPS via nebulizer and were sacrificed 6 hours later. a. Representative microphotographs of H&E-stained sections of lungs of animals that received LPS or 1G3E5 alone or combined. b. Density of inflammation evaluated histologically in animals that received saline (n=3), 1G3E5 at 2.5 mg/kg (n=3), LPS (n=5), or 1G3E5 at 2.5 mg/kg plus LPS. Results were analyzed by unpaired t-test. P values are indicated.

Figure 7A:
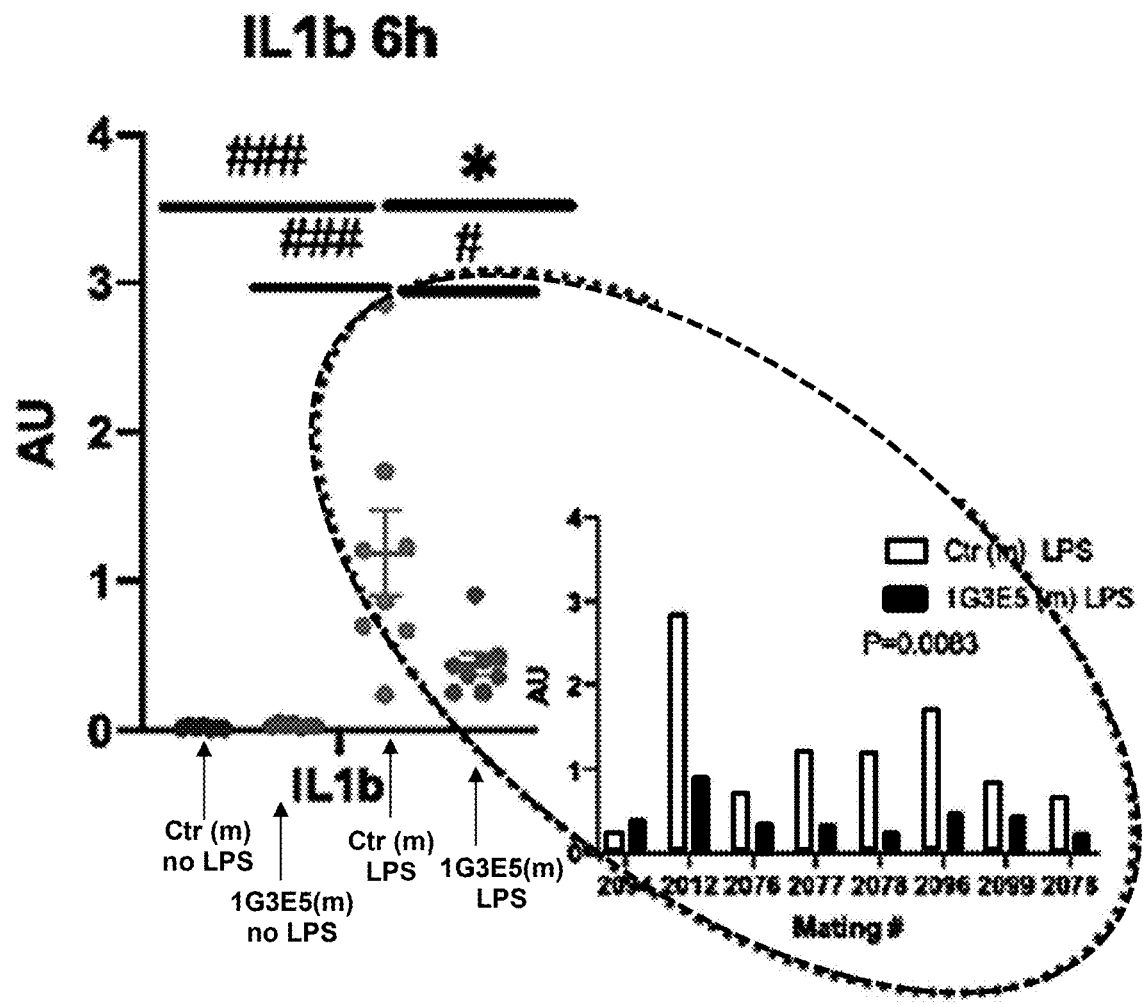

FIG. 7A illustrates the effect of 1G3E5 on expression of IL1b in the lungs of deer mice.

Figure 7B:
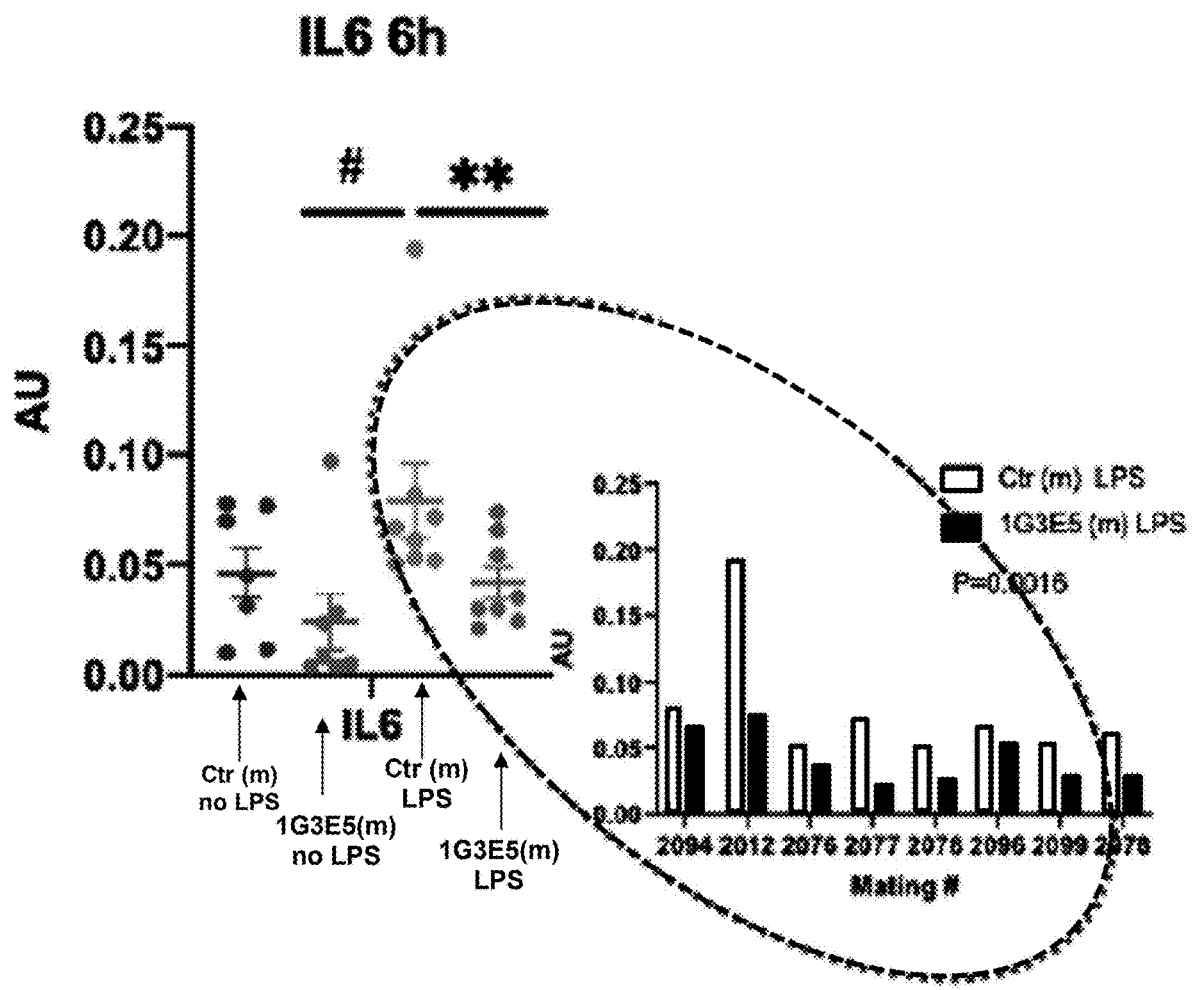

FIG. 7B illustrates the effect of IG3E5 on expression of IL6 in the lungs of deer mice.

Figure 7C:
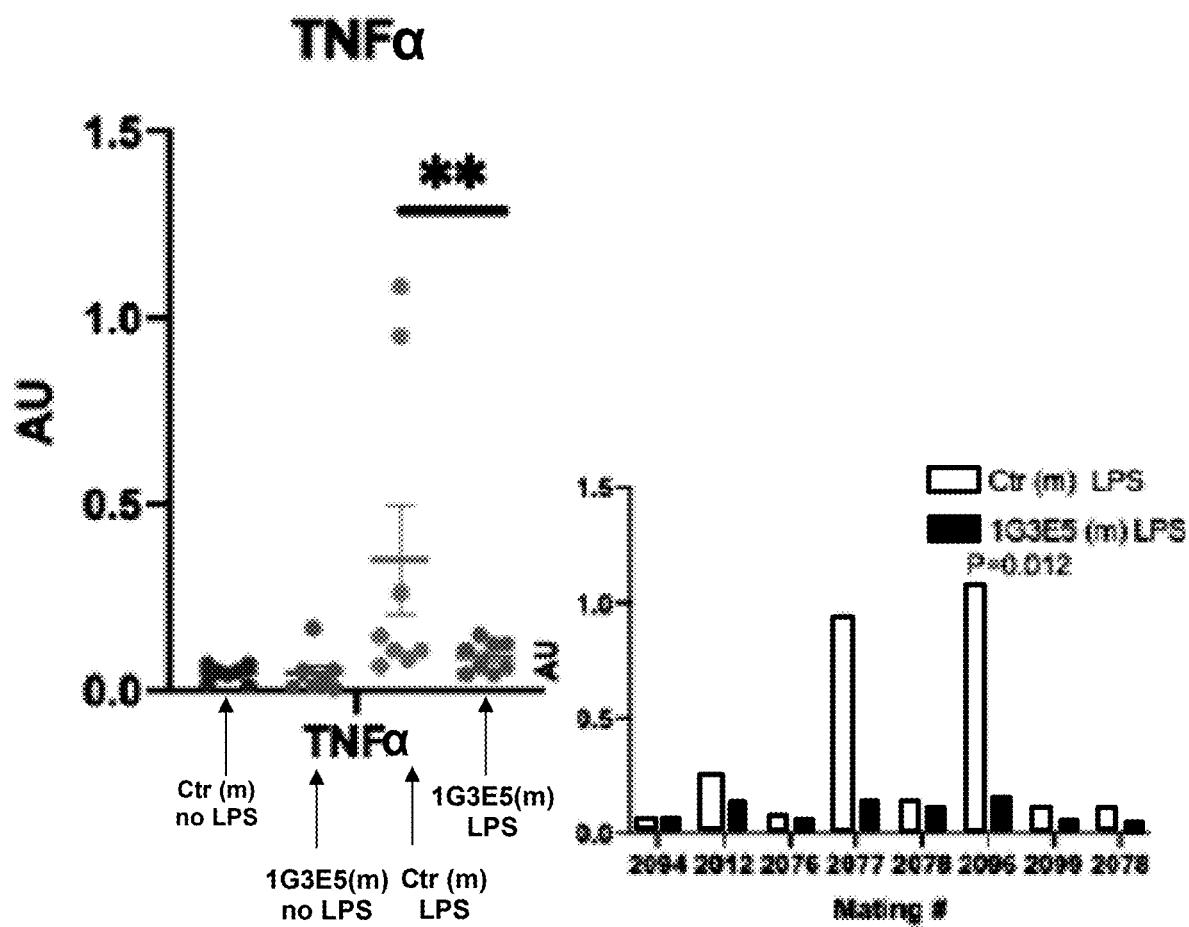

FIG. 7C illustrates the effect of IG3E5 on expression of TNFα in the lungs of deer mice.

Figure 7D:
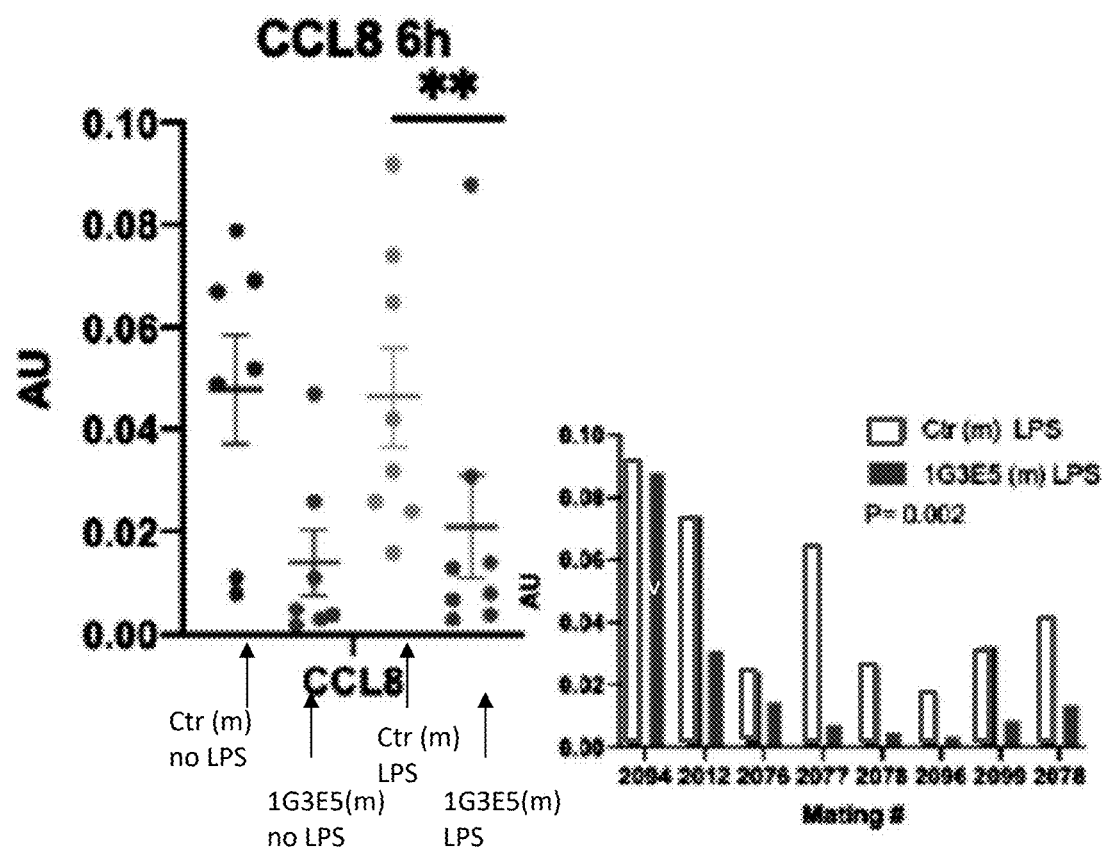

FIG. 7D illustrates the effect of IG3E5 on expression of CCL8 in the lungs of deer mice.

In all of FIGS. 7A-7D, deer mice received saline (n=7) (Ctr), 1G3E5 at 2.5 mg/kg (n=7) (1G3E5 no LPS), LPS (n=8) (CTR LPS), or 1G3E5 (n=8) at 2.5 mg/kg plus LPS (1G3E5 LPS). Expression was normalized versus GAPDH expression and expressed in arbitrary units (AU). Comparisons between all groups were performed by ANOVA and the results are expressed as mean±SEM. Significance is indicated as follows: #, P<0.05; ###, P<0.001. Comparisons between animals that were siblings in the groups that received LPS alone or combined with 1G3E5 were performed by Wilcoxon non-parametric test. Significance was indicated as follows: *, P<0.05; ** P<0.01. Dashed black ovals of FIGS. 7A and 7B show the individual expression levels in the siblings that received LPS or LPS plus 1G3E5. Mating number of parents is indicated. Results were analyzed by ratio paired t-test, and P values are indicated.

Figure 8:
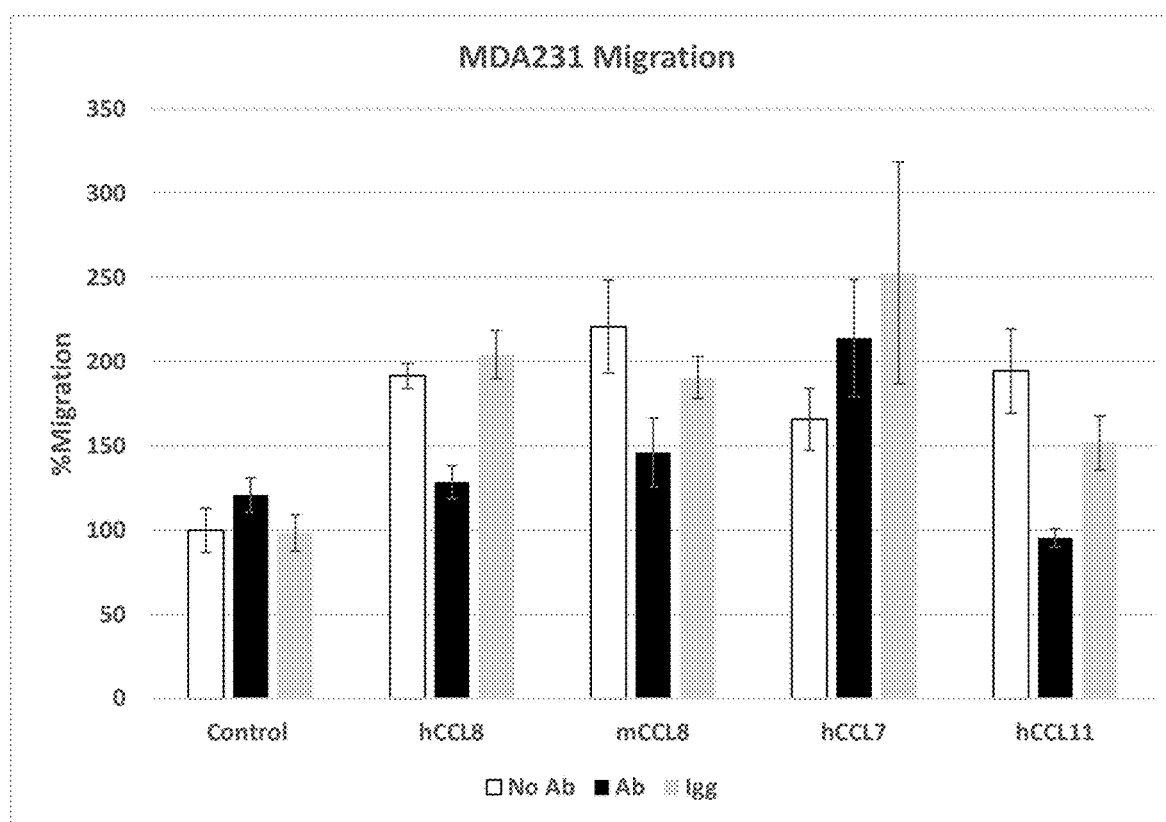

FIG. 8 compares the inhibition of MDA231 cell migration induced by human CCL8, mouse CCL8, human CCL7, and human CCL11 in the presence or absence of a chimeric human/mouse antibody described herein.

DETAILED DESCRIPTION

The following description and other modifications and variations to the presently disclosed subject matter may be practiced by those of ordinary skill in the art, without departing from the spirit and scope of the present invention. In addition, it should be understood that aspects of the various embodiments may be interchanged both in whole and in part. Furthermore, those of ordinary skill in the art will appreciate that the following description is by way of example only and is not intended to limit the disclosed subject matter.

In one embodiment, disclosed herein are methods for treating lung injury by administration of an anti-CCL8 antibody to a subject in need thereof. Also disclosed herein are methods for evaluating a potential lung therapy by use of an animal model of the genus *Peromyscus*. Also disclosed is a chimeric human/mouse anti-CCL8 antibody as may in one embodiment be utilized in disclosed methods.

The terms "treat," "treating," or "treatment" as used herein, refers to a method of alleviating or abrogating a disorder and/or its attendant symptoms. The terms "prevent," "preventing," or "prevention," as used herein, refer to a method of barring a subject from acquiring a disorder and/or its attendant symptoms. In certain embodiments, the terms "prevent," "preventing," or "prevention" refer to a method of reducing the risk of acquiring a disorder and/or its attendant symptoms.

In one embodiment, the presently disclosed methods and materials are directed to inhibition of CCL8 activity. While not wishing to be bound to any particular theory, it is believed that inhibition of CCL8 can mitigate pulmonary inflammation and can be beneficially utilized to treat and/or prevent fibrosis due to lung injury.

In one embodiment, a method can include administering to a subject diagnosed with lung injury that can include uncontrolled pulmonary pro-inflammatory response a therapeutically effective amount of an anti-CCL8 antibody or antigen-binding fragment thereof. According to this embodiment, inflammation and long term lung injury such as fibrosis can be prevented by decreasing the activity of CCL8 in the lungs. In one embodiment, a method can be utilized in treating a subject diagnosed with lung injury due to an infective agent, and in one particular embodiment, due to a coronavirus infection, e.g., a severe acute respiratory syndrome (SARS)-associated coronavirus infection.

In one embodiment, a method can include administering to an animal model of the genus *Peromyscus* suffering from a lung injury an amount of a potential therapy, e.g., an anti-CCL8 antibody or fragment thereof, another antibody of interest, a small molecule treatment of interest, or the like, and examination of the animal model to determine the effects of the potential therapy.

As used herein, the term "antibody" refers to immunoglobulin molecules and immunologically active portions of immunoglobulin (Ig) molecules, i.e., molecules that contain an antigen binding site that specifically binds (immune-reacts with) an antigen. The term "antibody" is used in the broadest sense and specifically covers monoclonal antibodies (including full length monoclonal antibodies), polyclonal antibodies, multi-specific antibodies (e.g., bispecific antibodies), and antibody fragments so long as they exhibit the desired biological activity. By "specifically bind" or "immune-reacts with" is meant that the antibody reacts with one or more antigenic determinants of the desired antigen and does not react (i.e., bind) with other polypeptides or binds at much lower affinity with other polypeptides. For instance, binding of the molecule to an epitope can be 2-fold greater or more, for instance, from about 2-fold to about 5-fold greater, than the binding of the molecule to an unrelated epitope or than the binding of an unrelated molecule to the epitope, as determined by techniques known in the art, such as, for example, ELISA, immunoprecipitation, two-hybrid assays, cold displacement assay, etc. Typically, specific binding can be distinguished from non-specific binding when the dissociation constant ($K_D$) is about $1 \times 10^{-5}$ M or less, or about $1 \times 10^{-6}$ M or less, for instance, about $1 \times 10^{-7}$ M, in some embodiments.

The term "antibody" also includes antibody fragments that comprise a portion of a full-length antibody, generally the antigen binding or variable region thereof. Examples of antibody fragments include Fab, Fab', F(ab')2, and Fv fragments; diabodies; linear antibodies; single-chain antibody (scFv) molecules; and multi-specific antibodies formed from antibody fragments. In certain embodiments of the invention, it may be desirable to use an antibody fragment rather than an intact antibody, for example, to increase penetration in the lung tissue.

The term "monoclonal antibody" as used herein refers to an antibody obtained from a population of substantially homogeneous antibodies, i.e., the individual antibodies comprising the population are identical except for possible naturally occurring mutations that may be present in minor amounts. The monoclonal antibodies herein specifically include "chimeric" antibodies in which a portion of the heavy and/or light chain is identical with or homologous to corresponding sequences in antibodies derived from a particular species or belonging to a particular antibody class or subclass, while the remainder of the chain(s) is identical with or homologous to corresponding sequences in antibodies derived from another species or belonging to another antibody class or subclass, as well as fragments of such antibodies, so long as they exhibit the desired biological activity.

In one embodiment, a method can utilize a monoclonal antibody or fragments thereof, e.g., an anti-CCL8 antibody or fragments thereof. In one embodiment, the antibody is a humanized antibody. In another embodiment, the antibody is a humanized antibody fragment. "Humanized" forms of non-human antibodies are chimeric antibodies which contain minimal sequence derived from non-human immunoglobulin. For the most part, humanized antibodies are human immunoglobulins (recipient antibody) in which residues from a hypervariable region of the recipient are replaced by residues from a hypervariable region of a non-human species (donor antibody) such as mouse, rat, rabbit, or non-human primate having the desired specificity, affinity, and/or capacity. Methods for making humanized and other chimeric antibodies are known in the art.

A complete antibody can generally be comprised of two immunoglobulin heavy chains and two immunoglobulin light chains, each of which includes a variable region and a constant region. In one particular embodiment, an antibody as disclosed herein can include as heavy chain variable region ($V_H$) SEQ ID NO: 4, and as light chain variable region ($V_L$), either SEQ ID NO: 12 ($V_{L1}$) or SEQ ID NO: 20 ($V_{L2}$). FIG. 1 presents the DNA sequences of a heavy chain variable region (SEQ ID NO: 3), a first light chain variable region (SEQ ID NO: 11) and a second light chain variable region (SEQ ID NO: 19), respectively, as well as the amino acid sequences for the heavy chain variable region (SEQ ID NO: 4), the first light chain variable region (SEQ ID NO: 12), and the second light chain variable region (SEQ ID NO: 20), respectively, of antibodies as disclosed herein. In FIG. 1, the leader sequence of each region is shown in bold font and the CDRs are underlined.

In one embodiment, a complete antibody can include SEQ ID NO: 30 as heavy chain variable region and SEQ ID NO: 28 as light chain variable region. FIG. 2 presents the DNA sequence (SEQ ID NO: 27) of this light chain variable region, and FIG. 3 presents the DNA sequence (SEQ ID NO: 29) of this heavy chain variable region. The heavy chain variable region described by SEQ ID NO: 30 is a component of a chimeric human/mouse antibody that includes the $V_H$ heavy chain variable region described by SEQ ID NO: 4, and the light chain variable region described by SEQ ID NO: 28 is a component of a chimeric human/mouse antibody that includes the $V_{L1}$ light chain variable region described by SEQ ID NO: 12.

A complete antibody can include both a heavy chain and a light chain variable portion of the disclosed antibodies, i.e., (SEQ ID NO: 4 ($V_H$) heavy chain and SEQ ID NO: 12 ($V_{L1}$) light chain, or SEQ ID NO: 4 ($V_H$) heavy chain and SEQ ID NO: 20 ($V_{L2}$) light chain, or SEQ ID NO: 28 and SEQ ID NO: 30) in conjunction with any suitable constant regions. In some embodiments, disclosed materials can include one or more isolated antigen binding portions of a complete antibody (e.g., CDR regions described by SEQ ID NOs: 6, 8, and 10 of $V_H$ SEQ ID NO: 4 and SEQ ID NO: 30; SEQ ID NOs: 14, 16, and 18 of $V_{L1}$ SEQ ID NO: 12 and SEQ ID NO: 28, or SEQ ID NOs: 22, 24, and 26 of $V_{L2}$ SEQ ID NO: 20) optionally in conjunction with their respective FR regions (underlined regions of SEQ ID NOs: 4, 12, 20, 28, 30 shown in FIG. 1, FIG. 2, FIG. 3). A CDR fragment can be provided, in one embodiment, bounded by one or both FR fragments as found in a complete variable region, or alternatively, can be utilized in an isolated format, independent of the natural FR fragments.

In one embodiment, the present disclosure is directed to animal models for use in studying therapies and/or preventatives for lung injury, and in one particular embodiment, for studying lung injury that involves an uncontrolled pro-inflammatory response. For instance, the animal model can be used in evaluating treatments and/or preventatives for lung tissue inflammation that is associated with ARDS and/or fibrosis associated with lung injury that is idiopathic or of a known source, including, without limitation, exposure to toxic agent or microbial infection. More specifically, an animal model can utilize an animal of the genus *Peromyscus* (deer mouse).

This particular genus can be attractive for use in an animal model as populations of this genus can be maintained in captivity and can accurately mimic the lung disease process and therapy response of other types of animals and, in particular, of humans. In addition, by being outbred, this animal model can better mimic natural human populations that exhibit high genetic diversity. This becomes particularly relevant in the context of chemokine-based therapeutics and for the assessment of immune system responses that are highly diverse in people. Thus, the use of these animals can provide a system that permits capture and appreciation of the potential therapeutic value of lung treatment therapeutics in a context that resembles human populations. Moreover, by being animals bred in captivity, the animal model can allow experimentation in sibling pairs that, in turn, permit adequate pairwise comparison of the experimental findings.

As utilized herein, the term "outbred" generally refers to animals within a group of which there is some genetic variation and for whom inbreeding has been minimized to not more than about 1% per generation, for instance, as can be achieved with random mating using about 25 or more breeding pairs per generation. For instance, a colony can include about 100 or more breeding pairs or even more, in some embodiments. As such, genetic drift due to inbreeding can be minimal, though the stock characteristics may change as a result of selective breeding or the like.

Another benefit of the animal model is that *Peromyscus* live considerably longer than laboratory mice (5-8 years for the former as compared to 2-3 years for the latter), which is particularly advantageous considering that lung injury such as fibrosis can often not present for some time after the initial injury. Utilizing the *Peromyscus* animal model that readily allows the evaluation of the effects of a potential treatment on long-term lung damage may be especially valuable in some embodiments.

Any species of the *Peromyscus* genus can be utilized as the animal of the model including, without limitation, those of the groups *californicus, eremicus, hooperi, crinitus, maniculatus, leucopus, aztecus, truei, melanophrys, furvus, mealops*, and *mexicanus*. In one embodiment, the animal of the model can be of the *P. californicus* species. *P. californicus* is the physically largest *Peromyscus* species (adult weight is about 42 g) and has a lifespan exceeding 5.5 years in captivity. *P. californicus* has been used for behavioral studies as it has a social organization that is monogamous, with males and females forming long-term relationships. Males help care for the young, and the male's presence increases their chance of survival. In view of the role of sex hormones in regulating such behavioral traits, the value of this animal as a lung damage model increases by the fact that it exhibits patterns similar to those of humans and is divergent from those of laboratory mice.

Preferred species for use in a study can vary depending upon factors such as, and without limitation to, the particular lung injury to be studied, the presence and type of therapy to be used in the study (e.g., proteinaceous, small molecule, combination, etc.), the type and delivery mode of the therapy, etc.

In one embodiment, the particular species can be chosen based upon natural levels or similarity of materials in the animals as compared to that for humans. For instance, a species in which the natural level or structure of one or more proteins involved in the particular lung injury being studied (e.g., CCL8) is similar to that of humans can be a good candidate for an animal model studying that particular injury. By way of example, CCL8 of *P. maniculatus* is more similar to that of humans than is that of mouse. As such, the *P. maniculatus* species can be a good candidate when studying lung damage in which CCL8 plays a role as has been proposed in the case of ARDS development in patients diagnosed with COVID-19.

The animal model can be utilized in studying lung injury development and/or lung injury therapies and preventatives by induction of lung damage in the animal, e.g., by induction of lipopolysaccharide-induced pulmonary inflammation. The *Peromyscus*-based animal model can be utilized in research directed to any disease that involves lung damage, as well as to therapies and/or preventatives for use in any aspect of a disease process. It will be understood that while much of this discussion concerns study of peptide-base agents, e.g., antibody-based treatments, the disclosed animal model is not limited to such approaches for examination of possible lung injury therapies. In addition, a method of studying a lung injury therapy as described can encompass study of the animal model prior to, during, and following inducement of damage, as well as delivery of the agent(s) of interest. A therapy agent can be a known or potential lung injury therapy agent, but it should be understood that the invention is not limited to such agents. For instance, in one embodiment, a therapy agent can include an environmental agent that may positively or negatively affect the lung injury or the symptoms thereof, e.g., inflammation and/or development of fibrosis.

Peptide-based treatment materials encompassed herein for either animal-based model study or in therapeutic applications can incorporate modifications as would be understood by one of skill in the art. For instance, there are many natural amino acids, which occur as L-isomers in most living organisms; however, embodiments of the disclosure are not limited to only L-amino acids and can include modifications that substitute D-amino acids or other non-proteinogenic amino acids that are not naturally encoded by humans or any other organism. Herein, unless specifically referenced as a D-amino acid (i.e., the amino acid identifier followed by (d)), reference to a generic amino acid indicates the L-amino acid.

In embodiments of the disclosure, an agent can include an ornithine substitution to disclosed peptides, e.g., to disclosed CDR fragments or FR fragments. In some embodiments, an agent can include one or more amino acid substitutions of a human proteinogenic amino acids selected from the following group: alanine, arginine, asparagine, aspartic acid, cysteine, glutamic acid, glutamine, glycine, histidine, isoleucine, leucine, lysine, methionine, phenylalanine, proline, serine, threonine, tryptophan, tyrosine, and valine.

In embodiments, an agent can include structurally and/or functionally similar peptides to those disclosed herein. Structurally similar peptides can encompass variations such as the substitution of one amino acid having a first amino acid side chain with a second amino acid having a second amino acid side chain. Both the first amino acid side chain and the second amino acid side chain provide a similar characteristic to maintain functional similarity of the agent, e.g., CCL8 epitope binding. A similar characteristic can include a side chain that has a similar polarity, charge, or size as the first amino acid side chain. As an example, leucine includes a hydrophobic side chain, and in some embodiments, an agent can include substitution of a leucine of a disclosed sequence (e.g., a CDR sequence) with an isoleucine, valine, or alanine, as each of these amino acids includes a similar hydrophobic side chain. As another example, histidine includes an aromatic side chain that can also carry a positive charge, and in some embodiments, one or more histidines of an antibody of interest, or fragment thereof, can be substituted with an amino acid that includes an aromatic side chain or with an amino acid that can carry a positive charge such as phenylalanine, tyrosine, tryptophan, arginine, or lysine. These are provided as examples of possible substitutions and are not meant to limit the scope of variations contemplated by substituting amino acids that have similar side chain properties.

In some embodiments, the antigen binding fragments comprise a Fab, in which the fragment contains a monovalent antigen binding fragment of the antibody molecule, and which can be produced by digestion of whole antibody with the enzyme papain to yield an intact light chain variable region (e.g., SEQ ID NO: 12, SEQ ID NO: 20, SEQ ID NO: 28) and a portion of a heavy chain (e.g., one or more of SEQ ID NOs: 6, 8, 10), optionally in conjunction with one or more of the intervening FR fragments.

In one embodiment, the antigen binding fragment can comprise a Fab', which is the fragment of the antibody molecule that can be obtained by treating whole antibody with pepsin, followed by reduction, to yield an intact light chain or the variable region thereof (e.g., SEQ ID NO: 12, SEQ ID NO: 20, SEQ ID NO: 28) and a portion of the heavy chain (e.g., one or more of SEQ ID NOs: 6, 8, 10), optionally in conjunction with one or more of the intervening FR fragments; two Fab' fragments can be obtained per antibody molecule. A (Fab')2 fragment of the antibody is encompassed, which can be obtained by treating a whole antibody with the enzyme pepsin without subsequent reduction. A F(ab')2 fragment is a dimer of two Fab' fragments held together by two disulfide bonds. Also encompassed is a Fv, which is a genetically engineered fragment containing the variable region of the light chain and the variable region of the heavy chain expressed as two chains. In one embodiment, an antibody can encompass a single-chain antibody ("SCA"), which is a genetically engineered molecule containing the variable region of the light chain and the variable region of the heavy chain, linked by a suitable polypeptide linker as a genetically fused single-chain molecule. An antibody fragment can be an scFv-Fc, which is produced in one embodiment by fusing single-chain Fv (scFv) with a hinge region from an immunoglobulin (Ig) such as an IgG, and Fc regions.

An antibody or antigen binding fragment thereof can include a modification, as is known in the art, that does not or is being examined to confirm that it does not interfere with the specific recognition and binding with the targeted epitope. For instance, a modification can minimize conformational changes during the shift from displayed to secreted forms of the antibody or fragment. As is understood by a skilled artisan, the modification can be a modification known in the art to impart a functional property that would not otherwise be present if it were not for the presence of the modification. The invention encompasses materials that are differentially modified during or after translation, e.g., by glycosylation, acetylation, phosphorylation, amidation, derivatization by known protecting/blocking groups, proteolytic cleavage, linkage to a particle, another molecule or other cellular ligand, etc. Any of numerous chemical modifications may be carried out by known techniques including, but not limited to, specific chemical cleavage by cyanogen bromide, trypsin, chymotrypsin, papain, V8 protease, NaBH$_4$, acetylation, formylation, oxidation, reduction, metabolic synthesis in the presence of tunicamycin, etc.

A modification can include an N-terminus modification and/or a C-terminal modification. For example, the modification can include an N-terminus biotinylation and/or a C-terminus biotinylation. In one embodiment, the secretable form of the antibody or antigen binding fragment comprises an N-terminal modification that allows binding to an Immunoglobulin (Ig) hinge region. In another embodiment, the Ig hinge region is from, but is not limited to, an IgA hinge region. In another embodiment, the secretable form of the antibody or antigen binding fragment comprises an N-terminal modification and/or a C-terminal modification that allows binding to an enzymatically biotinylatable site. In another embodiment, biotinylation of said site can functionalize the site to bind to any surface coated with streptavidin, avidin, avidin-derived moieties, or a secondary reagent.

A modification can include, for example, addition of N-linked or O-linked carbohydrate chains, attachment of chemical moieties to the amino acid backbone, chemical modifications of N-linked or O-linked carbohydrate chains, and addition or deletion of an N-terminal methionine residue.

The antibodies or antigen binding fragments can be produced by any synthetic or recombinant process such as is well known in the art. The antibodies or antigen binding fragments can further be modified to alter biophysical or biological properties by means of techniques known in the art. For example, an antibody can be modified to increase its stability against proteases, or to modify its lipophilicity, solubility, or binding affinity to an epitope.

By way of example, the antibodies can be produced by the immunization of various animals, including mice, rats, rabbits, goats, primates, chickens, and humans with a target antigen, such as an entire CCL8 sequence as described (SEQ ID NO: 2) or a peptide fragment of CCL8 containing one or more of sequences that include at least one anti-CCL8 epitope (e.g., SEQ ID NO: 1). In one embodiment, the antigen or peptide fragment containing the antigen can be purified prior to immunization of the animal. The antibody or antigen binding fragment obtained following the immunization can be purified by methods known in the art, for example, gel filtration, ion exchange, affinity chromatography, etc. Affinity chromatography or any of a number of other techniques known in the art can be used to isolate polyclonal or monoclonal antibodies from serum, ascites fluid, or hybridoma supernatants.

"Purified" means that the antibody is separated from at least some of the proteins normally associated with the antibody and preferably separated from all cellular materials other than proteins.

The antibodies or antigen binding fragments thereof may be produced by using gene recombination techniques. For example, in formation of a chimeric antibody, a humanized antibody, a functional fragment of antibody or the like, such as an Fv, an SCA, an scFv-Fc or the like, genetic recombination techniques.

In one embodiment, a method for producing an agent that incorporates all or a portion, either as described or with modifications, of a variable region of a heavy chain (SEQ ID NO: 4, SEQ ID NO: 30) and a variable region of a light chain (SEQ ID NO: 12, SEQ ID NO: 20, SEQ ID NO: 28), e.g., including one or more CDR regions (SEQ ID NOs: 6, 8, 10, 14, 26, 18, 22, 24, 26), for instance, in formation of a chimeric antibody for study as a potential lung therapy, can be carried out through utilization of genetic recombination techniques.

By way of example, DNA encoding an amino acid sequence represented by SEQ ID NO: 4 or SEQ ID NO: 30 or a modification thereof can be prepared. Likewise, DNA encoding an amino acid sequence represented by SEQ ID NO: 12, SEQ ID NO: 20, or SEQ ID NO: 28 or a modification thereof can be prepared. Examples of such DNA include those represented by SEQ ID NO: 3, SEQ ID NO: 11 SEQ ID NO: 19, SEQ ID NO: 27, and SEQ ID NO: 29, respectively; however, those having other nucleotide sequences may be used.

Portions or mutants of sequences, which still retain desired activity or are to be examined to determine the retention of desired activity, are also considered within the scope of this disclosure. For example, mutants can include alterations to SEQ ID NOs: 3, 11, 19, 27, and 29 that encode one or more amino acid substitutions (e.g., mutating a codon for valine to a codon for alanine). Additionally, or alternatively, mutants of a DNA sequence can include one or more point mutations to the native cDNA sequence to substitute a degenerate codon for the native codon.

For embodiments that include a mutant of a nucleic acid sequence as disclosed (e.g., SEQ ID NOs: 3, 11, 19, 27, 29, or portions thereof encoding a CDR region of an antibody including SEQ ID NOs: 5, 7, 9, 13, 15, 17, 21, 23, 25), the mutant can include one or more codon mutations that modify the expressed protein to substitute one hydrophobic amino acid (e.g., valine) for another hydrophobic amino acid (e.g., alanine, leucine, isoleucine, proline, phenylalanine, methionine, or tryptophan) to produce an antibody variant.

Due to codon redundancy, there are many theoretically possible cDNA sequence variants that could encode an antibody or antigen binding fragment of interest. Additionally, variants that modify the native protein sequence while retaining binding activity, further increase this number. For these embodiments, a genetic modification can result in the expression of a peptide (e.g., SEQ ID NOs: 4, 12, 20, 28, 30 or the CDRs thereof) or a peptide variant that retains the binding function of the native peptide.

A DNA encoding $V_H$ (e.g., SEQ ID NO: 3, SEQ ID NO: 29), $V_{L1}$ (SEQ ID NO: 11, SEQ ID NO: 27), $V_{L2}$ (SEQ ID NO: 19), or a variation thereof that is of interest can be inserted into a vector having a sequence encoding the respective constant regions of a human antibody to construct a chimeric antibody expression vector. Vectors having a sequence encoding $C_H$ or $C_L$ of a human antibody as may be utilized are commercially available. By introducing the constructed expression vector into a host cell, a recombinant cell that expresses a chimeric antibody can be obtained. Following, the recombinant cell can be cultured, and a desired chimeric antibody can be acquired from the culture.

A host cell is not particularly limited as long as the expression vector is able to function therein. By way of example, animal cells (e.g., COS cells, CHO cells, HEK cells, and the like), yeast, bacteria (*Escherichia coli* and the like), plant cells, insect cells, and the like may be appropriately employed.

In one embodiment, a recombination technique can be utilized to produce an antibody including specific CDR including one or more of SEQ ID NOs: 6, 8, 10, 14, 16, 18, 22, 24, 26 or variations thereof of interest. For instance, a method can be utilized in forming a humanized antibody, which, as utilized herein refers to an antibody having a CDR derived from an animal other than human, and other regions (framework region, constant region and the like) derived from human.

For example, nucleotide sequences encoding heavy chain CDRs (SEQ ID NOs: 6, 8, 10) and light chain CDRs (SEQ ID NOs: 14, 16, 18, or 22, 24, 26) of an antibody can be prepared. As the DNA, a sequence corresponding to each CDR nucleotide sequence represented by SEQ ID NOs: 5, 7, 9, 13, 15, 17, 21, 23, 25 is exemplified; however, as discussed above, those having other nucleotide sequences may be used, particularly in embodiments directed to examination of potential lung therapies. DNA may be prepared by known methods such as PCR. The DNA may be prepared by chemical synthesis.

Using these sequences, a sequence encoding a variable region in which heavy chain CDR encoding regions (e.g., SEQ ID NOs: 5, 7, 9) are grafted to the respective regions encoding framework regions (FR) of $V_H$ in a human antibody can be prepared. Likewise, sequences encoding a variable region in which light chain CDR encoding regions (e.g., SEQ ID NOs: 13, 15, 17, 21, 23, 25) are grafted to the respective regions encoding FR of $V_L$ in a human antibody can be prepared. The prepared nucleic acid sequence can then be inserted into a vector having a sequence encoding the desired constant region ($C_H$ or $C_L$) of a human antibody, so as to construct a humanized antibody expression vector. By introducing the constructed expression vector into a host cell, a recombinant cell that expresses a humanized antibody can obtained. The recombinant cell can then be cultured, and a desired humanized antibody can be acquired from the culture.

An agent including fewer than all of the CDRs of a full antibody can be produced in a similar procedure. For instance, an agent that includes only the $V_H$ or only the $V_L$ region of an antibody, absent the constant region, can be produced in a similar fashion.

Methods for purifying an agent formed according to methods as described herein are not particularly limited and known techniques may be employed. For example, a culture supernatant of a hybridoma or a recombinant cell may be collected, and the antibody or antigen binding fragment may be purified by a combination of known techniques, such as various kinds of chromatography, salt precipitation, dialysis, membrane separation, and the like. When the isotype of the antibody is IgG, the antibody may be conveniently purified by affinity chromatography using protein A.

An agent may be administered to a subject in either a therapy application or a research application, according to known methods, such as intravenous administration as a bolus or by continuous infusion over a period of time, by intramuscular, intraperitoneal, intracerebrospinal, subcutaneous, intra-articular, intrasynovial, intrathecal, oral, topical, or inhalation routes. In certain embodiments, an agent is administered directly to the lungs by, e.g., inhalation or other administration routes.

A composition including an active component (e.g., an anti-CCL8 antibody) can be administered in conjunction with an accepted pharmaceutically acceptable carrier. Acceptable carriers include, but are not limited to, saline, buffered saline, and glucose in saline. Solid supports, liposomes, nanoparticles, microparticles, nanospheres or microspheres may also be used as carriers for administration of the antibodies.

The appropriate dosage ("therapeutically effective amount") of the active component can depend, for example, on the particular lung injury to be treated, the severity and course of the injury, whether the agent is administered for preventive, therapeutic, or research purposes, previous therapy, the patient's clinical history and response to the agent, the type of agent used, and the discretion of the attending physician. An active agent can be administered to a subject at one time or over a series of treatments and may be administered to the subject at any time from diagnosis onwards. An agent may be administered as the sole treatment or in conjunction with other drugs or therapies useful in treating lung injury.

In one embodiment, a therapeutically effective amount of an agent can be in the range of about 1 ng/kg body weight/day to about 100 mg/kg body weight/day whether by one or more administrations. For example, an anti-CCL8 antibody can be administered in an amount of from about 1 ng/kg body weight/day to about 1 μg/kg body weight/day, or from about 0.5 mg/kg body weight per day to about 50 mg/kg body weight/day, in some embodiments. In other particular embodiments, the amount of an agent administered can be from about, 0.0005 mg/day to about 1000 mg/day, or from about 0.1 mg/day to about 500 mg/day, in some embodiments. As expected, the dosage will be dependent on the condition, size, age, and condition of the subject.

An active agent may be administered, as appropriate or indicated, as a single dose as a bolus or by continuous infusion, or as multiple doses by bolus or by continuous infusion. Multiple doses may be administered, for example, multiple times per day; once daily; every 2, 3, 4, 5, 6, or 7 days; weekly; every 2, 3, 4, 5, or 6 weeks; or monthly. However, other dosage regimens may be useful. The progress of this therapy is easily monitored by conventional techniques.

As used herein, the term "pharmaceutically acceptable carrier" is intended to include any and all solvents, solubilizers, fillers, stabilizers, binders, absorbents, bases, buffering agents, lubricants, controlled release vehicles, diluents, emulsifying agents, humectants, lubricants, dispersion media, coatings, antibacterial or antifungal agents, isotonic and absorption delaying agents, and the like, compatible with pharmaceutical administration. The use of such media and agents for pharmaceutically active substances is well-known in the art. Except insofar as any conventional media or agent is incompatible with the active compound, use thereof in the compositions is contemplated. Supplementary agents can also be incorporated into the compositions.

A pharmaceutical composition can be formulated to be compatible with its intended route of administration. Examples of routes of administration include parenteral, e.g., intrathecal, intra-arterial, intravenous, intradermal, subcutaneous, oral, transdermal (topical), and transmucosal administration. In certain embodiments, the pharmaceutical composition is administered directly into the tissue surrounding a tumor.

Solutions or suspensions used for parenteral, intradermal, or subcutaneous application can include the following components: a sterile diluent such as water for injection, saline solution, fixed oils, polyethylene glycols, glycerin; propylene glycol or other synthetic solvents; antibacterial agents such as benzyl alcohol or methyl parabens; antioxidants such as ascorbic acid or sodium bisulfate; chelating agents such as ethylenediaminetetraacetic acid; buffers such as acetates, citrates, or phosphates; and agents for the adjustment of tonicity such as sodium chloride or dextrose. pH can be adjusted with acids or bases, such as hydrochloric acid or sodium hydroxide. The parenteral preparation can be enclosed in ampoules, disposable syringes, or multiple dose vials made of glass or plastic.

Pharmaceutical compositions suitable for injectable use include sterile aqueous solutions (where water soluble) or dispersions and sterile powders for the extemporaneous preparation of sterile injectable solutions or dispersion. For intravenous administration, suitable carriers include physiological saline, bacteriostatic water, Cremophor® EL (BASF™, Parsippany, N.J.) or phosphate buffered saline (PBS). In all cases, the injectable composition should be sterile and should be fluid to the extent that easy syringeability exists. It must be stable under the conditions of manufacture and storage and must be preserved against the contaminating action of microorganisms such as bacteria and fungi. The carrier can be a solvent or dispersion medium containing, for example, water, ethanol, polyol (for example, glycerol, propylene glycol, and liquid polyethylene glycol, and the like), and suitable mixtures thereof. The proper fluidity can be maintained, for example, by the use of a coating such as lecithin, by the maintenance of the required particle size in the case of dispersion, and by the use of surfactants. Prevention of the action of microorganisms can be achieved by various antibacterial and antifungal agents, for example, parabens, chlorobutanol, phenol, ascorbic acid, thimerosal, and the like. In many cases, it will be preferable to include isotonic agents, for example, sugars, polyalcohols such as mannitol, sorbitol, and sodium chloride, in the composition. Prolonged absorption of the injectable compositions can be brought about by including in the composition an agent that delays absorption, for example, aluminum monostearate or gelatin.

Oral compositions generally include an inert diluent or an edible carrier. They can be enclosed in gelatin capsules or compressed into tablets. For the purpose of oral therapeutic administration, the active compound can be incorporated with excipients and used in the form of tablets, troches, or capsules. Oral compositions can also be prepared using a fluid carrier for use as a mouthwash, wherein the compound in the fluid carrier is applied orally and swished and expectorated or swallowed. Pharmaceutically compatible binding agents and/or adjuvant materials can be included as part of the composition. The tablets, pills, capsules, troches, and the like can contain any of the following ingredients, or compounds of a similar nature: a binder such as microcrystalline cellulose; gum tragacanth or gelatin; an excipient such as starch or lactose; a disintegrating agent such as alginic acid, Primojel®, or corn starch; a lubricant such as magnesium stearate or Stertes; a glidant such as colloidal silicon dioxide; a sweetening agent such as sucrose or saccharin; or a flavoring agent such as peppermint, methyl salicylate, or orange flavoring.

For administration by inhalation, the compounds are delivered in the form of an aerosol spray from pressured container or dispenser which contains a suitable propellant, e.g., a gas such as carbon dioxide, or a nebulizer.

Systemic administration can also be by transmucosal or transdermal means. For transmucosal or transdermal administration, penetrants appropriate to the barrier to be permeated are used in the formulation. Such penetrants are generally known in the art and include for transmucosal administration, for example, detergents, bile salts, and fusidic acid derivatives. Transmucosal administration can be accomplished through the use of nasal sprays or suppositories. For transdermal administration, the pharmaceutical compositions are formulated into ointments, salves, gels, or creams, as generally known in the art.

In certain embodiments, the pharmaceutical composition is formulated for sustained or controlled release of the active ingredient. Biodegradable, biocompatible polymers can be used, such as ethylene vinyl acetate, polyanhydrides, polyglycolic acid, collagen, polyorthoesters, and polylactic acid. Methods for preparation of such formulations will be apparent to those skilled in the art. The materials can also be obtained commercially, for example, from Alza Corporation and Nova Pharmaceuticals, Inc. Liposomal suspensions (including liposomes targeted to infected cells with monoclonal antibodies to viral antigens) can also be used as pharmaceutically acceptable carriers. These can be prepared according to methods known to those skilled in the art, for example, as described in U.S. Pat. No. 4,522,811.

It is especially advantageous to formulate oral or parenteral compositions in dosage unit form for ease of administration and uniformity of dosage. Dosage unit form, as used herein, includes physically discrete units suited as unitary dosages for the subject to be treated, each unit containing a pre-determined quantity of active compound calculated to produce the desired therapeutic effect in association with the required pharmaceutical carrier. The specification for the dosage unit forms of the application are dictated by and directly dependent on the unique characteristics of the active compound and the particular therapeutic effect to be achieved, and the limitations inherent in the art of compounding such an active compound for the treatment of individuals.

Disclosed methods and materials can be utilized, in one embodiment, for therapeutic interference for targeting breast cancer metastasis. Also suggested is a novel paradigm on how dissemination of the cancer cells can be attained beyond the conventional notion of EMT induction and stochastic stimulation of epithelial cell motility. Accordingly, even transient activation of CCL8 levels in peripheral tissues, such as may be caused by inflammation, may attract circulating cancer cells and may trigger metastatic seeding.

Presently disclosed methods and materials may be beneficial in preventing such metastatic processes.

The present invention may be better understood with reference to the Examples, set forth below.

Example 1

Figure 4:
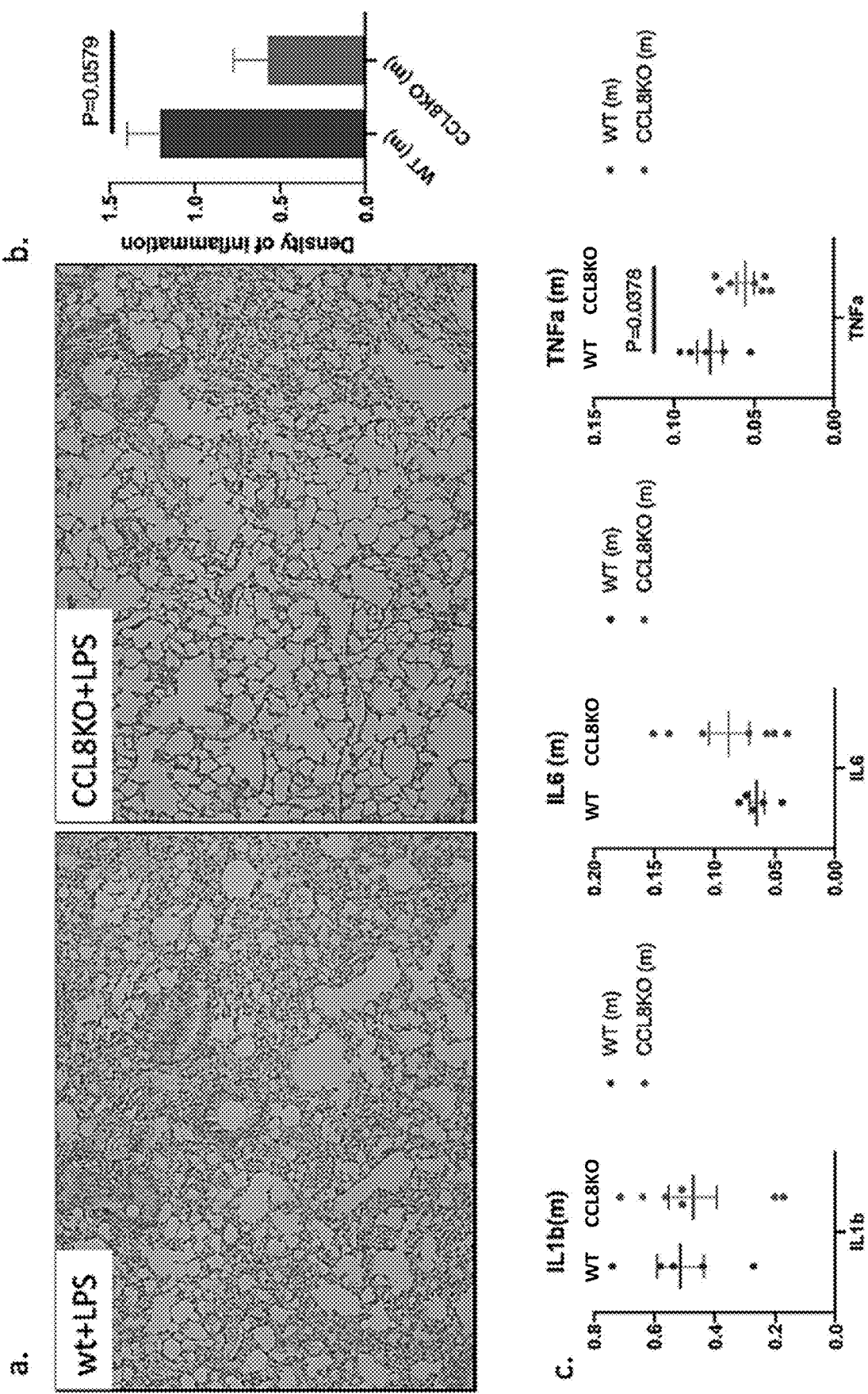
FIG. 4 illustrates the effect of CCL8 genetic ablation in LPS-induced pulmonary inflammation in mice. Animals received 2 mg LPS via nebulizer and sacrificed 6 hours later.

In order to test if CCL8 is implicated in inflammation related to lung injury, a pilot study was performed in which wild type (wt) and mice deficient for CCL8 (CCL8KO) received LPS via nebulizer to evaluate the extent of lung inflammation. Histological assessment indicated moderate inhibition of inflammation in the lungs of CCL8-deficient mice that remained marginally insignificant as compared to the wt controls (FIG. 4 at a and b). Evaluation of IL-6, IL-1 b and TNFα that are linked to the cytokine cascade at lung injury showed that TNFα was significantly suppressed in the lungs of CCL8KO mice following administration of LPS (FIG. 4 at c).

Example 2

It was hypothesized that the moderate impact of CCL8 ablation recorded in CCL8KO mice may be related to the fact that CCL8 deficiency is constitutive, implying that acute inhibition of CCL8 may have more pronounced effects during acute lung injury. To that end, a neutralizing antibody against human CCL8 (IG3E5) was examined that can be used for inhibition of CCL8 activity in human patients. In view of the low homology between human and mouse CCL8 (71%, FIG. 5 at a), especially at the antigenic peptide used for the development of the 1G3E5 antibody (6 out of 14 amino acid identities, FIG. 5 at a, top), another experimental rodent model that encodes for a CCL8 ortholog that possesses higher similarity to hCCL8 than mCCL8 was utilized. *P. maniculatus* (North American deer mouse) has 80% similarity with human CCL8 that is retained in the antigenic peptide (10 out of 14 amino acid identities, FIG. 5 at a, bottom). To explore the potency of 1G3E5 in inhibiting pCCL8, its neutralizing activity was compared against hCCL8- and pCCL8-induced migration of RAW macrophages. As shown in FIG. 5 at b, clone 1G3E5 significantly inhibited RAW macrophage migration that was stimulated by both human and *P. maniculatus* CCL8 (hCCL8 and pCCL8 respectively). Thus, in vivo studies were carried out using outbred deer mice as rodent model.

Example 3

To evaluate if acute suppression of CCL8 by neutralizing antibody 1G3E5 interferes with lung inflammation, LPS was administered alone or combined with 1G3E5 to genetically diverse deer mice. Lung histology was evaluated after 6 hours. For this study, available sibling pairs were distributed evenly in the LPS and the 1G3E5+LPS groups to reduce effect bias due to genetic differences of the experimental animals. As shown in FIG. 3 at b, LPS significantly induced lung inflammation and this effect was mitigated by 1G3E5 ($P<0.05$). Following, the effects of LPS alone or in combination with 1G3E5 in the expression of CCL8, IL1 b, IL-6, and TNFα in the lungs was evaluated. As shown in FIG. 6, LPS stimulated the expression of IL1 b, IL-6, and TNFα at variable levels, likely due to the genetic diversity of the animals. 1G3E5 caused an insignificant inhibition of these cytokines that was significant when administered in combination with LPS. Interestingly, CCL8 expression was not stimulated by LPS, while 1G3E5 inhibited its expression in both the control and the LPS-treated animals. The fact that sibling pairs were included in the LPS and the LPS+1G3E5 groups facilitated paired analysis in cytokine expression to absorb the variation in levels of expression due to the specimens' genetic heterogeneity. This analysis indicated significant inhibition of all cytokines, including CCL8 by 1G3E5.

Example 4

A chimeric human/mouse antibody targeting human CCL8 was created incorporating SEQ ID NO: 4 in the heavy chain variable region and SEQ ID NO: 12 in the light chain variable region. The cloning vector plasmid pTRIOZ-hIgG1 (available from InvivoGen®, San Diego, CA) was utilized. cDNA including SEQ ID NO: 3 and SEQ ID NO: 11 from the variable heavy and light regions were cloned into the heavy chain cassette multiple cloning site (MCS) and the light chain MCS, respectively.

The resulting chimeric human/mouse antibody was examined to determine inhibition of migration of MDA231 breast cancer cells induced by human CCL8 (hCCL8), murine CCL8 (mCCL8), human CCL7 (hCCL7) and human CCL11 (hCCL11). No antibody and IgG1 were used as controls.

To carry out the examination, about $10^4$ cells were seeded on the top chamber of Costar® Transwell® (24-well format, with 8-μm pore size insert, Corning®, Waltham, MA, USA) in serum-free media. The top chamber was inserted in the plates containing 600 μl of medium supplemented with 10% FBS and with 10 ng/ml of chemoattractant (hCCL8, mCCL8, hCCL7 or hCCL11, CellGS, St. Louis, MO, USA) and 1 μg/ml of the human/mouse chimeric antibody targeting human CCL8 or human IgG1 isotype control (Bio X Cell, Lebanon, NH, USA). After 16 h, the top chamber was removed and cells on bottom chamber were counted using the TC20™ Automated Cell Counter (Bio-Rad™, Hercules, CA, USA).

The results are shown in FIG. 8. As can be seen, the chimeric antibody successfully inhibited MDA231 migration induced by both human and mouse CCL8 as well as human CCL11.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for treating a subject diagnosed with acute respiratory distress syndrome or a severe acute respiratory syndrome (SARS) associated coronavirus infection comprising administering an anti-CCL8 antibody or antigen binding fragment thereof to pulmonary tissue of the subject, wherein the anti-CCL8 antibody or antigen binding fragment thereof includes SEQ ID NO: 4 and SEQ ID NO: 12 or includes SEQ ID NO: 4 and SEQ ID NO: 20.

2. The method of claim 1, wherein the antibody is a monoclonal antibody.

3. The method of claim 1, wherein the antibody or antigen binding fragment thereof is an antigen binding fragment that comprises a Fab, a Fab', a F(ab')2, a Fv, a disulfide linked Fv, or a scFv.

4. The method of claim 1, wherein the anti-CCL8 antibody or antigen binding fragment thereof is administered in an amount of between 1 ng/kg body weight/day and 100 mg/kg body weight/day.

* * * * *

SEQUENCE LISTING

```
Sequence total quantity: 30
SEQ ID NO: 1          moltype = AA  length = 15
FEATURE               Location/Qualifiers
```

```
source                      1..15
                            mol_type = protein
                            organism = synthetic construct
SEQUENCE: 1
CINRKIPIQR LESYT                                                        15

SEQ ID NO: 2                moltype = AA   length = 99
FEATURE                     Location/Qualifiers
source                      1..99
                            mol_type = protein
                            organism = Homo sapiens
SEQUENCE: 2
MKVSAALLCL LLMAATFSPQ GLAQPDSVSI PITCCFNVIN RKIPIQRLES YTRITNIQCP        60
KEAVIFKTKR GKEVCADPKE RWVRDSMKHL DQIFQNLKP                               99

SEQ ID NO: 3                moltype = DNA   length = 402
FEATURE                     Location/Qualifiers
source                      1..402
                            mol_type = other DNA
                            organism = synthetic construct
SEQUENCE: 3
atggaatgta actggatact tccttttatt ctgtcggtaa tttcaggggt ctactcagag        60
gttcagctcc agcagtctgg gactgtgctg gcaaggcctg gggcttccgt gaagatgtcc      120
tgtaaggctt ctggctacag ctttaccagc tactggatgc actgggtcaa acagaggcct     180
ggacagggtc tggaatggat tggtgctatt tatcctggaa atagtgatag tggctacaat     240
aagaagttca agggcaaggc caaactgact gcagtcactt ccgccagcac tgcctacatg     300
gagctcagca gcttgacaaa tgaggactct gcggtctatt actgttccca tacagcctgg     360
tttgtttact ggggccaagg gactctggtc actgtctctg ca                        402

SEQ ID NO: 4                moltype = AA   length = 134
FEATURE                     Location/Qualifiers
source                      1..134
                            mol_type = protein
                            organism = synthetic construct
SEQUENCE: 4
MECNWILPFI LSVISGVYSE VQLQQSGTVL ARPGASVKMS CKASGYSFTS YWMHWVKQRP        60
GQGLEWIGAI YPGNSDSGYN KKFKGKAKLT AVTSASTAYM ELSSLTNEDS AVYYCSHTAW      120
FVYWGQGTLV TVSA                                                        134

SEQ ID NO: 5                moltype = DNA   length = 15
FEATURE                     Location/Qualifiers
source                      1..15
                            mol_type = other DNA
                            organism = synthetic construct
SEQUENCE: 5
agctactgga tgcac                                                        15

SEQ ID NO: 6                moltype = AA   length = 5
FEATURE                     Location/Qualifiers
source                      1..5
                            mol_type = protein
                            organism = synthetic construct
SEQUENCE: 6
SYWMH                                                                    5

SEQ ID NO: 7                moltype = DNA   length = 51
FEATURE                     Location/Qualifiers
source                      1..51
                            mol_type = other DNA
                            organism = synthetic construct
SEQUENCE: 7
gctatttatc ctggaaatag tgatagtggc tacaataaga agttcaaggg c                 51

SEQ ID NO: 8                moltype = AA   length = 17
FEATURE                     Location/Qualifiers
source                      1..17
                            mol_type = protein
                            organism = synthetic construct
SEQUENCE: 8
AIYPGNSDSG YNKKFKG                                                      17

SEQ ID NO: 9                moltype = DNA   length = 18
FEATURE                     Location/Qualifiers
source                      1..18
                            mol_type = other DNA
                            organism = synthetic construct
SEQUENCE: 9
acagcctggt ttgtttac                                                     18
```

```
SEQ ID NO: 10              moltype = AA   length = 6
FEATURE                    Location/Qualifiers
source                     1..6
                           mol_type = protein
                           organism = synthetic construct
SEQUENCE: 10
TAWFVY                                                                        6

SEQ ID NO: 11              moltype = DNA   length = 396
FEATURE                    Location/Qualifiers
source                     1..396
                           mol_type = other DNA
                           organism = synthetic construct
SEQUENCE: 11
atgatgagtc ctgcccagtt cctgtttctg ttagtgctct ggattcggga aaccaacggt            60
gatgttgtga tgacccagac tccactcact ttgtcggtta ccattggaca accagcctcc           120
atctcttgca agtcaagtca gagccttta gatagtgatg gaaggacata tttgaattgg           180
ttgttacaga ggccaggcca gtctccaaag cgcctaatct atctggttc taaactggac           240
tctggagtcc ctgacaggtt cactggcagt ggatcaggga cagatttcac actgaaaatc           300
agcagagtgg aggctgagga tttgggagtt tattattgct ggcaaggtgc acatttcct           360
cagacgttcg gtggaggcac caagctggaa atcaaa                                     396

SEQ ID NO: 12              moltype = AA   length = 132
FEATURE                    Location/Qualifiers
source                     1..132
                           mol_type = protein
                           organism = synthetic construct
SEQUENCE: 12
MMSPAQFLFL LVLWIRETNG DVVMTQTPLT LSVTIGQPAS ISCKSSQSLL DSDGRTYLNW            60
LLQRPGQSPK RLIYLVSKLD SGVPDRFTGS GSGTDFTLKI SRVEAEDLGV YYCWQGAHFP           120
QTFGGGTKLE IK                                                               132

SEQ ID NO: 13              moltype = DNA   length = 48
FEATURE                    Location/Qualifiers
source                     1..48
                           mol_type = other DNA
                           organism = synthetic construct
SEQUENCE: 13
aagtcaagtc agagcctctt agatagtgat ggaaggacat atttgaat                         48

SEQ ID NO: 14              moltype = AA   length = 16
FEATURE                    Location/Qualifiers
source                     1..16
                           mol_type = protein
                           organism = synthetic construct
SEQUENCE: 14
KSSQSLLDSD GRTYLN                                                            16

SEQ ID NO: 15              moltype = DNA   length = 21
FEATURE                    Location/Qualifiers
source                     1..21
                           mol_type = other DNA
                           organism = synthetic construct
SEQUENCE: 15
ctggtgtcta aactggactc t                                                      21

SEQ ID NO: 16              moltype = AA   length = 7
FEATURE                    Location/Qualifiers
source                     1..7
                           mol_type = protein
                           organism = synthetic construct
SEQUENCE: 16
LVSKLDS                                                                       7

SEQ ID NO: 17              moltype = DNA   length = 27
FEATURE                    Location/Qualifiers
source                     1..27
                           mol_type = other DNA
                           organism = synthetic construct
SEQUENCE: 17
tggcaaggtg cacattttcc tcagacg                                                27

SEQ ID NO: 18              moltype = AA   length = 9
FEATURE                    Location/Qualifiers
source                     1..9
                           mol_type = protein
                           organism = synthetic construct
SEQUENCE: 18
WQGAHFPQT                                                                     9
```

```
SEQ ID NO: 19           moltype = DNA   length = 381
FEATURE                 Location/Qualifiers
source                  1..381
                        mol_type = other DNA
                        organism = synthetic construct
SEQUENCE: 19
atgaggttcc aggttcaggt tctggggctc cttctgctct ggatatcagg tgcccagtgt    60
gatgtccaga taacccagtc tccatcttat cttgctgcat ctcctggaga aaccattact   120
tttaattgca gggcaagtaa gagcattagc aaatatttcg cctggtatca agagaaacct   180
gggaaaacta taagcttcta tatctactct ggatccactt tgcaatctgg aattccatca   240
aggttcagtg gcagtggatc tggtacagat ttcaatctca ccatcagtag cctggagcct   300
gaagattttg caatgtatta ctgtcaacag cataatgaat acccgctcac gttcggtgct   360
gggaccaagc tggagctgaa a                                             381

SEQ ID NO: 20           moltype = AA    length = 127
FEATURE                 Location/Qualifiers
source                  1..127
                        mol_type = protein
                        organism = synthetic construct
SEQUENCE: 20
MRFQVQVLGL LLLWISGAQC DVQITQSPSY LAASPGETIT FNCRASKSIS KYFAWYQEKP    60
GKTNKLLIYS GSTLQSGIPS RFSGSGSGTD FNLTISSLEP EDFAMYYCQQ HNEYPLTFGA   120
GTKLELK                                                             127

SEQ ID NO: 21           moltype = DNA   length = 33
FEATURE                 Location/Qualifiers
source                  1..33
                        mol_type = other DNA
                        organism = synthetic construct
SEQUENCE: 21
agggcaagta agagcattag caaatatttc gcc                                 33

SEQ ID NO: 22           moltype = AA    length = 11
FEATURE                 Location/Qualifiers
source                  1..11
                        mol_type = protein
                        organism = synthetic construct
SEQUENCE: 22
RASKSISKYF A                                                         11

SEQ ID NO: 23           moltype = DNA   length = 21
FEATURE                 Location/Qualifiers
source                  1..21
                        mol_type = other DNA
                        organism = synthetic construct
SEQUENCE: 23
tctggatcca ctttgcaatc t                                              21

SEQ ID NO: 24           moltype = AA    length = 7
FEATURE                 Location/Qualifiers
source                  1..7
                        mol_type = protein
                        organism = synthetic construct
SEQUENCE: 24
SGSTLQS                                                               7

SEQ ID NO: 25           moltype = DNA   length = 27
FEATURE                 Location/Qualifiers
source                  1..27
                        mol_type = other DNA
                        organism = synthetic construct
SEQUENCE: 25
caacagcata atgaataccc gctcacg                                        27

SEQ ID NO: 26           moltype = AA    length = 9
FEATURE                 Location/Qualifiers
source                  1..9
                        mol_type = protein
                        organism = synthetic construct
SEQUENCE: 26
QQHNEYPLT                                                             9

SEQ ID NO: 27           moltype = DNA   length = 720
FEATURE                 Location/Qualifiers
source                  1..720
                        mol_type = other DNA
                        organism = synthetic construct
SEQUENCE: 27
```

-continued

```
atgatgagtc ctgcccagtt cctgtttctg ttagtgctct ggattcggga aaccaacggt   60
gatgttgtga tgacccagac tccactcact ttgtcggtta ccattggaca accagcctcc  120
atctcttgca agtcaagtca gagcctctta gatagtgatg gaaggacata tttgaattgg  180
ttgttacaga ggccaggcca gtctccaaag cgcctaatct atctggtgtc taaactggac  240
tctggagtcc ctgacaggtt cactggcagt ggatcaggga cagatttcac actgaaaatc  300
agcagagtgg aggctgagga tttgggagtt tattattgct ggcaaggtgc acattttcct  360
cagacgttcg gtgaggcac caagctgaa atcaaacgta cggtggctgc accatctgtc  420
ttcatcttcc cgccatctga tgagcagttg aaatctggaa ctgcctctgt tgtgtgcctg  480
ctgaataact tctatcccag agaggccaaa gtacagtgga aggtggataa cgccctgcag  540
tcgggtaact cccaggagag tgtcacagag caggacagca aggacagcac ctacagcctc  600
agcagcaccc tgacgctgag caaagcagac tacgagaaac acaaagtcta cgcctgcgaa  660
gtcacccatc agggcctgag ctcgcccgtc acaaagagct tcaacagggg agagtgttag  720

SEQ ID NO: 28       moltype = AA   length = 239
FEATURE             Location/Qualifiers
source              1..239
                    mol_type = protein
                    organism = synthetic construct
SEQUENCE: 28
MMSPAQFLFL LVLWIRETNG DVVMTQTPLT LSVTIGQPAS ISCKSSQSLL DSDGRTYLNW   60
LLQRPGQSPK RLIYLVSKLD SGVPDRFTGS GSGTDFTLKI SRVEAEDLGV YYCWQGAHFP  120
QTFGGGTKLE IKRTVAAPSV FIFPPSDEQL KSGTASVVCL LNNFYPREAK VQWKVDNALQ  180
SGNSQESVTE QDSKDSTYSL SSTLTLSKAD YEKHKVYACE VTHQGLSSPV TKSFNRGEC   239

SEQ ID NO: 29       moltype = DNA  length = 1401
FEATURE             Location/Qualifiers
source              1..1401
                    mol_type = other DNA
                    organism = synthetic construct
SEQUENCE: 29
atggaatgta actggatact ccttttatt ctgtcggtaa tttcagggt ctactcagag     60
gttcagctcc agcagtctgg gactgtgctg gcaaggcctg ggcttccgt gaagatgtcc   120
tgtaaggctt ctggctacag ctttaccagc tactggatgc actgggtcaa acagaggcct  180
ggacagggtc tggaatggat tggtgctatt tatcctggaa atagtgatag tggctacaat  240
aagaagttca agggcaaggc caaactgact gcagtcactt ccgccagcac tgcctacatg  300
gagctcagca gcttgacaaa tgaggactct gcggtctatt acgttccca tacagcctgg  360
tttgtttact ggggccaagg gactctggtc actgtctctg cagctagcgc tagcaccaag  420
ggcccatcgg tcttccccct ggcaccctcc tccaagagca cctctgggg cacagcggcc  480
ctgggctgcc tggtcaagga ctacttcccc gagccggtga cggtgtcgtg gaactcaggc  540
gccctgacca gcggcgtgca caccttcccg gctgtcctac agtcctcagg actctactcc  600
ctcagcagcg tggtgaccgt gccctccagc agcttgggca cccagaccta catctgcaac  660
gtgaatcaca agcccagcaa caccaaggtg gacaagaaag ttgagcccaa atcttgtgac  720
aaaactcaca catgcccacc gtgcccagca cctgaactcc tggggggacc gtcagtcttc  780
ctcttcccc caaaacccaa ggacaccctc atgatctccc ggacccctga ggtcacatgc  840
gtggtggtgg acgtgagcca cgaagaccct gaggtcaagt tcaactggta cgtggacggc  900
gtggaggtgc ataatgccaa gacaaagccg cgggaggagc agtacaacag cacgtaccgt  960
gtggtcagcg tcctcaccgt cctgcaccag gactggctga atggcaagga gtacaagtgc 1020
aaggtctcca acaaagccct cccagccccc atcgagaaaa ccatctccaa agccaaaggg 1080
cagccccgag aaccacaggt gtacaccctg cccccatccc gggacgagct gaccaagaac 1140
caggtcagcc tgacctgcct ggtcaaaggc ttctatccca gcgacatcgc cgtggagtgg 1200
gagagcaatg ggcagccgga gaacaactac aagaccacgc ctcccgtgct ggactccgac 1260
ggctccttct cctctacag caagctcacc gtggacaaga gcaggtggca gcaggggaac 1320
gtcttctcat gctccgtgat gcatgaggct ctgcacaacc actacacgca gaagagcctc 1380
tccctgtctc cgggtaaatg a                                           1401

SEQ ID NO: 30       moltype = AA   length = 466
FEATURE             Location/Qualifiers
source              1..466
                    mol_type = protein
                    organism = synthetic construct
SEQUENCE: 30
MECNWILPFI LSVISGVYSE VQLQQSGTVL ARPGASVKMS CKASGYSFTS YWMHWVKQRP   60
GQGLEWIGAI YPGNSDSGYN KKFKGKAKLT AVTSASTAYM ELSSLTNEDS AVYYCSHTAW  120
FVYWGQGTLV TVSAASASTK GPSVFPLAPS SKSTSGGTAA LGCLVKDYFP EPVTVSWNSG  180
ALTSGVHTFP AVLQSSGLYS LSSVVTVPSS SLGTQTYICN VNHKPSNTKV DKKVEPKSCD  240
KTHTCPPCPA PELLGGPSVF LFPPKPKDTL MISRTPEVTC VVVDVSHEDP EVKFNWYVDG  300
VEVHNAKTKP REEQYNSTYR VVSVLTVLHQ DWLNGKEYKC KVSNKALPAP IEKTISKAKG  360
QPREPQVYTL PPSRDELTKN QVSLTCLVKG FYPSDIAVEW ESNGQPENNY KTTPPVLDSD  420
GSFFLYSKLT VDKSRWQQGN VFSCSVMHEA LHNHYTQKSL SLSPGK                466
```